United States Patent
Kim et al.

(10) Patent No.: US 10,448,399 B2
(45) Date of Patent: Oct. 15, 2019

(54) METHOD FOR TRANSFERRING DATA IN WIRELESS COMMUNICATION SYSTEM THAT SUPPORTS DEVICE-TO-DEVICE COMMUNICATION, AND APPARATUS THEREFOR

(71) Applicants: LG ELECTRONICS INC., Seoul (KR); SEOUL NATIONAL UNIVERSITY R&DB FOUNDATION, Seoul (KR)

(72) Inventors: Hakseong Kim, Seoul (KR); Daeho Kang, Seoul (KR); Saewoong Bahk, Seoul (KR); Seungbeom Jeong, Seoul (KR); Changhee Joo, Ulsan (KR)

(73) Assignees: LG Electronics Inc., Seoul (KR); Seoul National University R&DB Foundation, Seoul (KR)

( * ) Notice: Subject to any disclaimer, the term of this patent is extended or adjusted under 35 U.S.C. 154(b) by 7 days.

(21) Appl. No.: 15/572,736

(22) PCT Filed: Oct. 26, 2015

(86) PCT No.: PCT/KR2015/011302
§ 371 (c)(1),
(2) Date: Nov. 8, 2017

(87) PCT Pub. No.: WO2016/186268
PCT Pub. Date: Nov. 24, 2016

(65) Prior Publication Data
US 2018/0146478 A1    May 24, 2018

Related U.S. Application Data

(60) Provisional application No. 62/161,896, filed on May 15, 2015.

(51) Int. Cl.
*H04W 72/04* (2009.01)
*H04W 76/14* (2018.01)
(Continued)

(52) U.S. Cl.
CPC ......... *H04W 72/0453* (2013.01); *H04W 4/06* (2013.01); *H04W 72/005* (2013.01);
(Continued)

(58) Field of Classification Search
None
See application file for complete search history.

(56) References Cited

U.S. PATENT DOCUMENTS

2007/0121521 A1* 5/2007 D'Amico ............... H04B 7/155
                                                370/252
2013/0083684 A1  4/2013 Yeh et al.
2015/0081840 A1* 3/2015 Patil ........................ H04L 67/28
                                                709/217

FOREIGN PATENT DOCUMENTS

KR    10-2015-0006372 A    1/2015
KR    10-2015-0051186 A    5/2015
(Continued)

*Primary Examiner* — Kouroush Mohebbi
(74) *Attorney, Agent, or Firm* — Dentons US LLP

(57) ABSTRACT

Disclosed are a method for transferring data in a wireless communication system that supports device-to-device communication, and an apparatus therefor. Specifically, a method for performing, by a device, data transfer in a wireless communication system that supports device-to-device communication, comprises the steps of: broadcasting, at a first sub-carrier, a ready-to-forward (RTF) signal for advertising that the device holds data to transfer; receiving, at a second sub-carrier, a forward-request (FR) signal for requesting transfer of the data from another device; and broadcasting the data after a predetermined time, wherein
(Continued)

the first sub-carrier and the second sub-carrier are determined on the basis of sequence numbers of the data, respectively.

13 Claims, 29 Drawing Sheets

(51) Int. Cl.
    *H04W 4/06*     (2009.01)
    *H04W 72/12*     (2009.01)
    *H04W 72/14*     (2009.01)
    *H04W 72/00*     (2009.01)
    *H04W 4/70*     (2018.01)

(52) U.S. Cl.
    CPC ....... *H04W 72/1257* (2013.01); *H04W 72/14* (2013.01); *H04W 76/14* (2018.02); *H04W 4/70* (2018.02)

(56) References Cited

FOREIGN PATENT DOCUMENTS

WO      2014/161069 A1    10/2014
WO      2015/021185 A1    2/2015

\* cited by examiner

[FIG. 1]
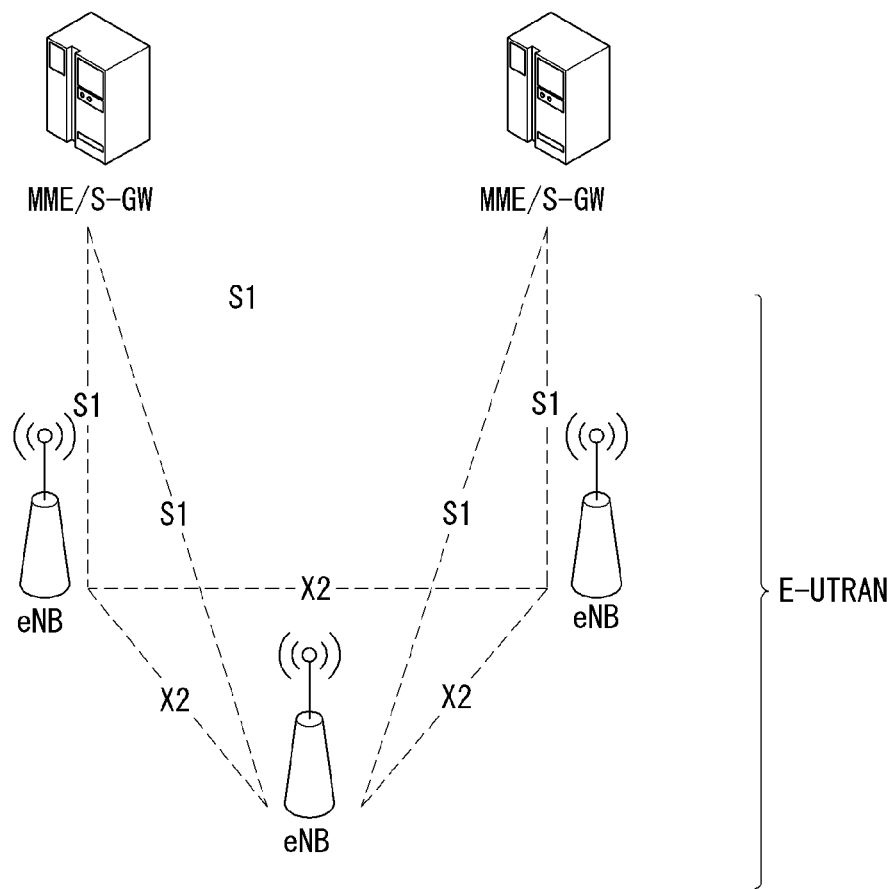

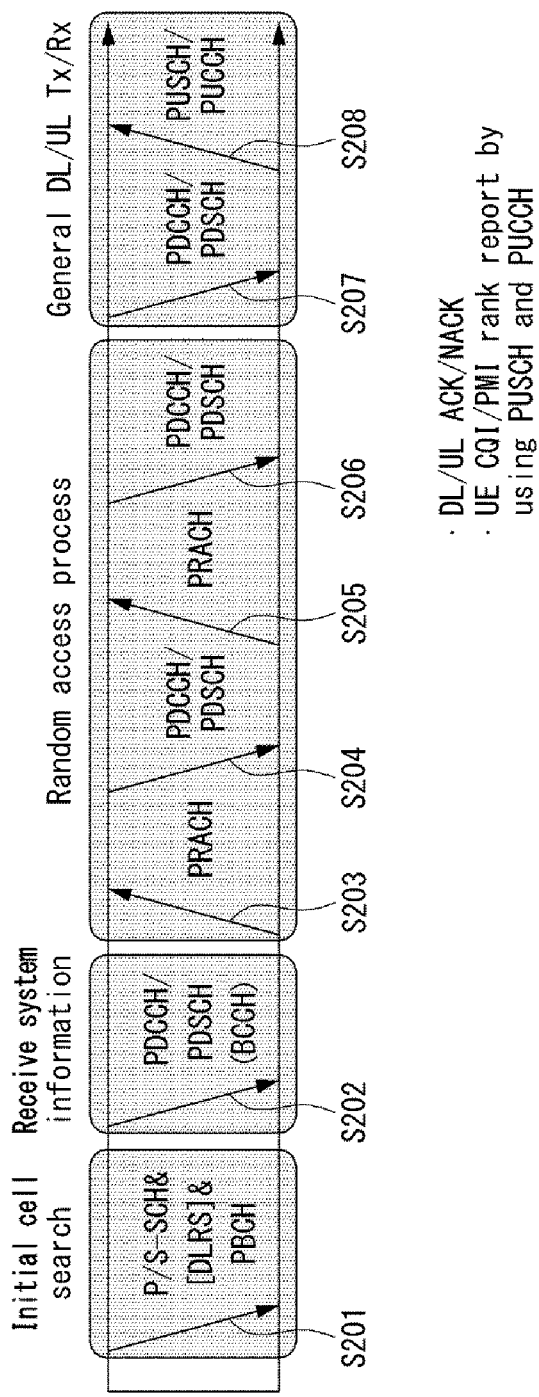

[FIG. 3]
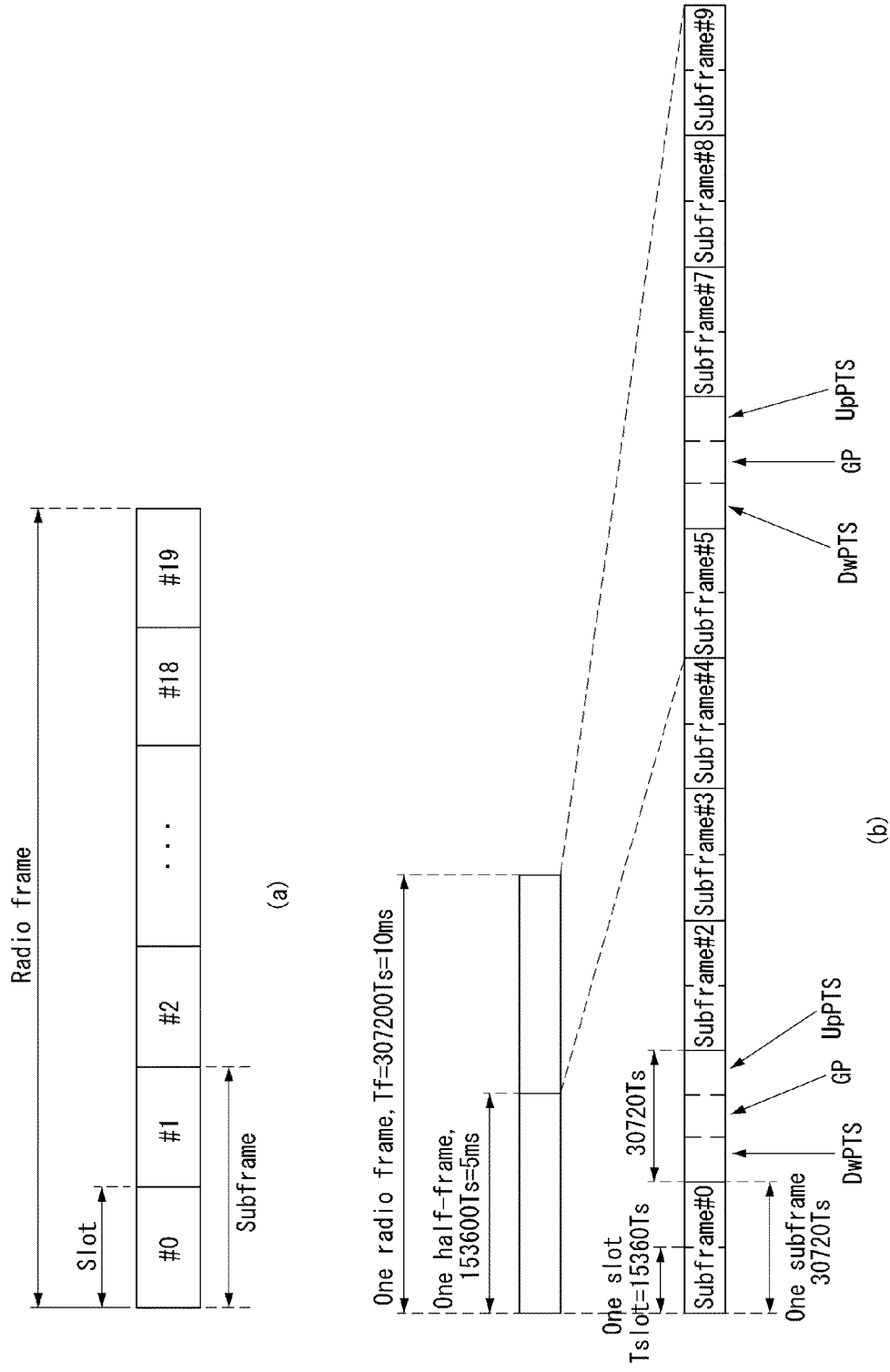

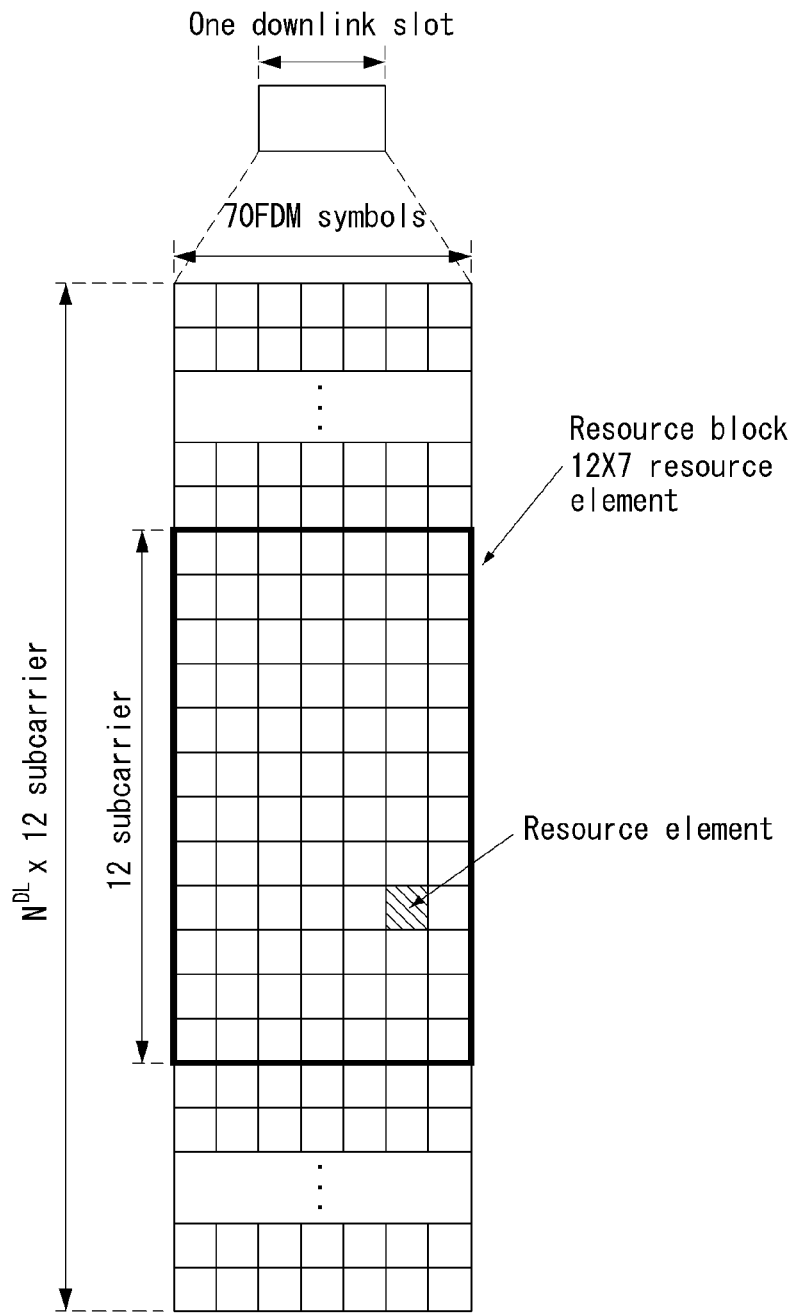
[FIG. 4]

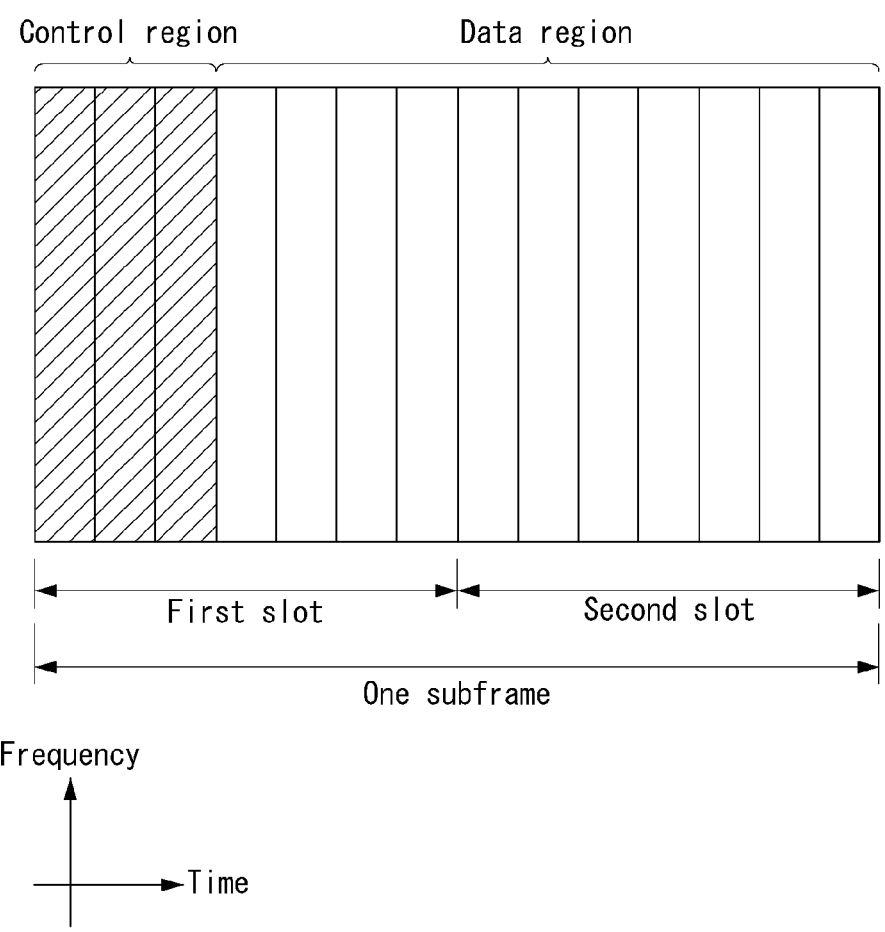
[FIG. 5]

[FIG. 6]
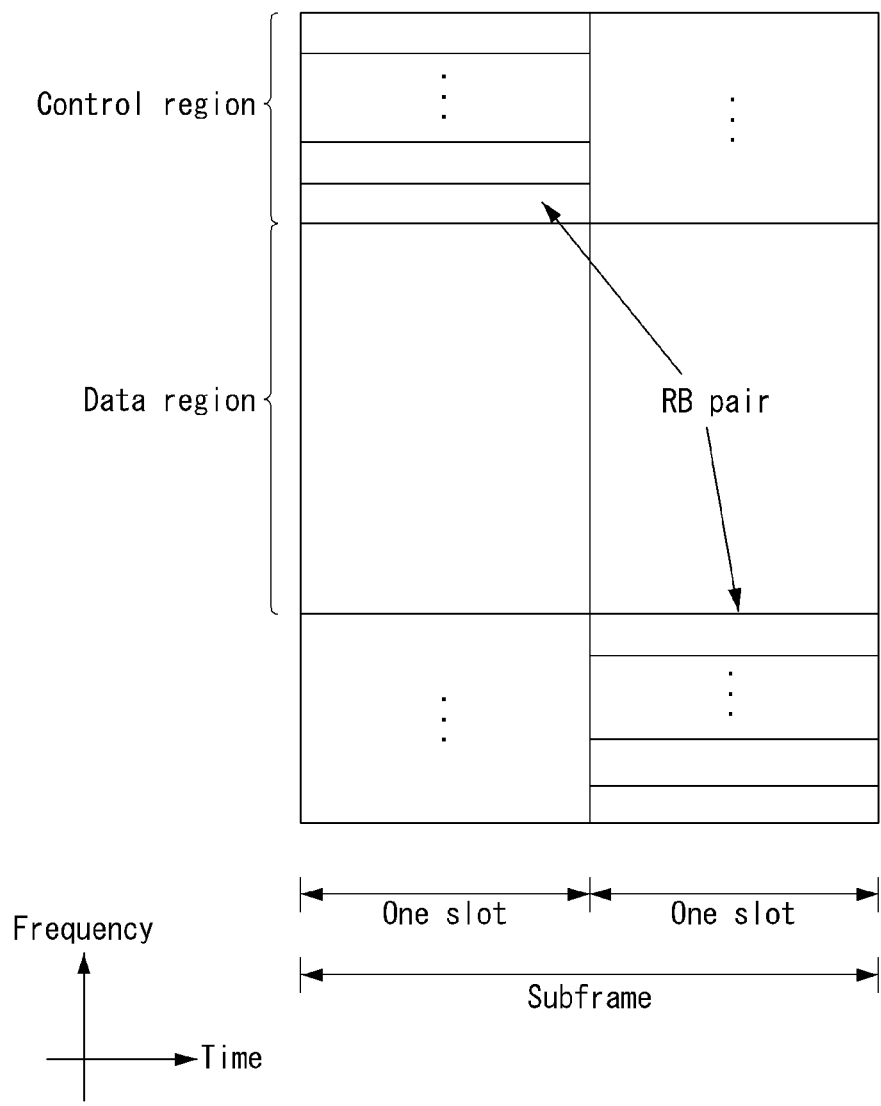

[FIG. 7]
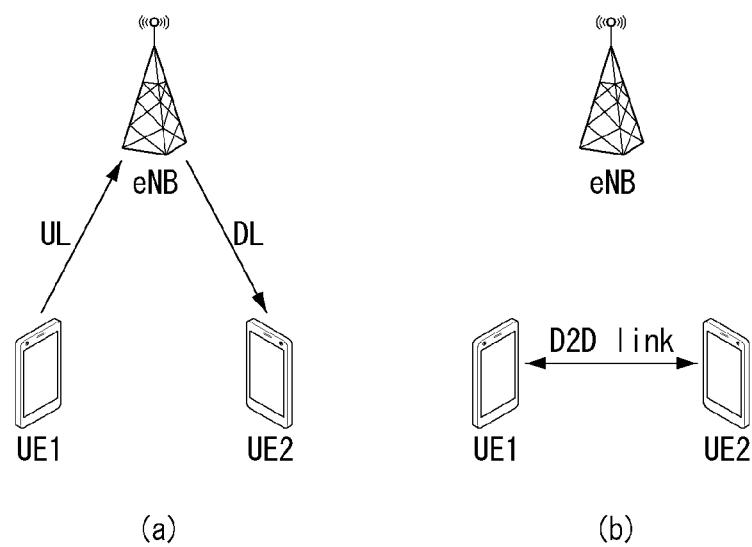

[FIG. 8]
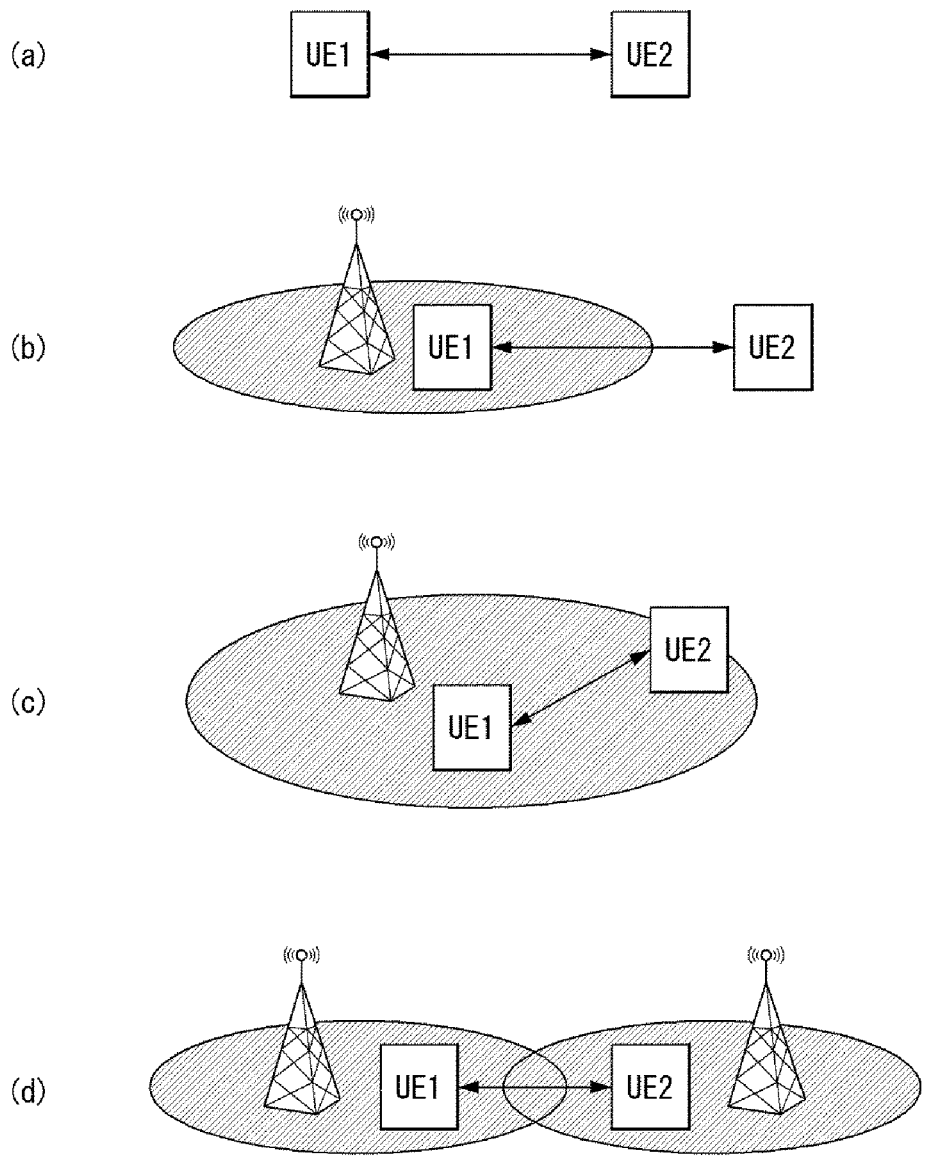

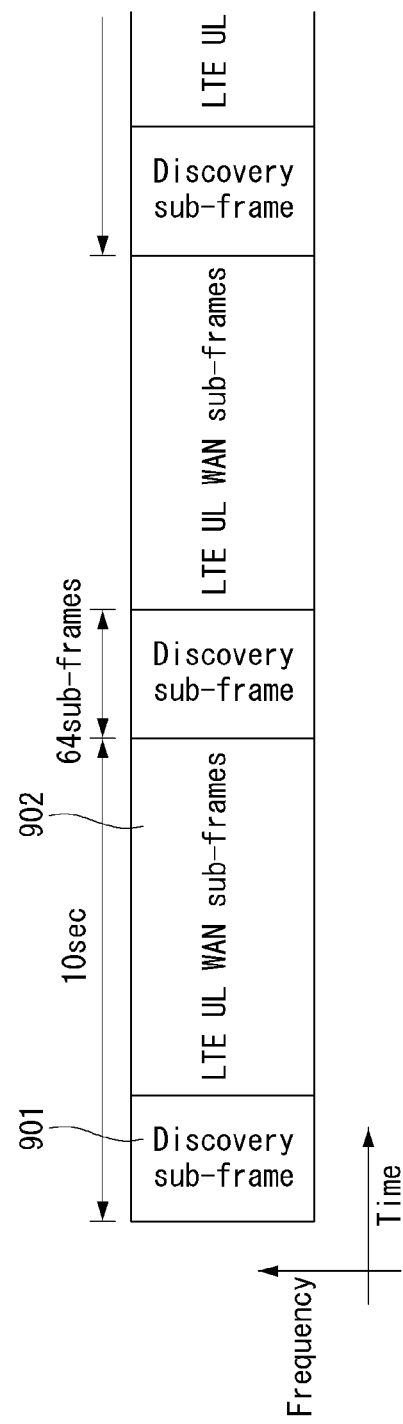

[FIG. 10]
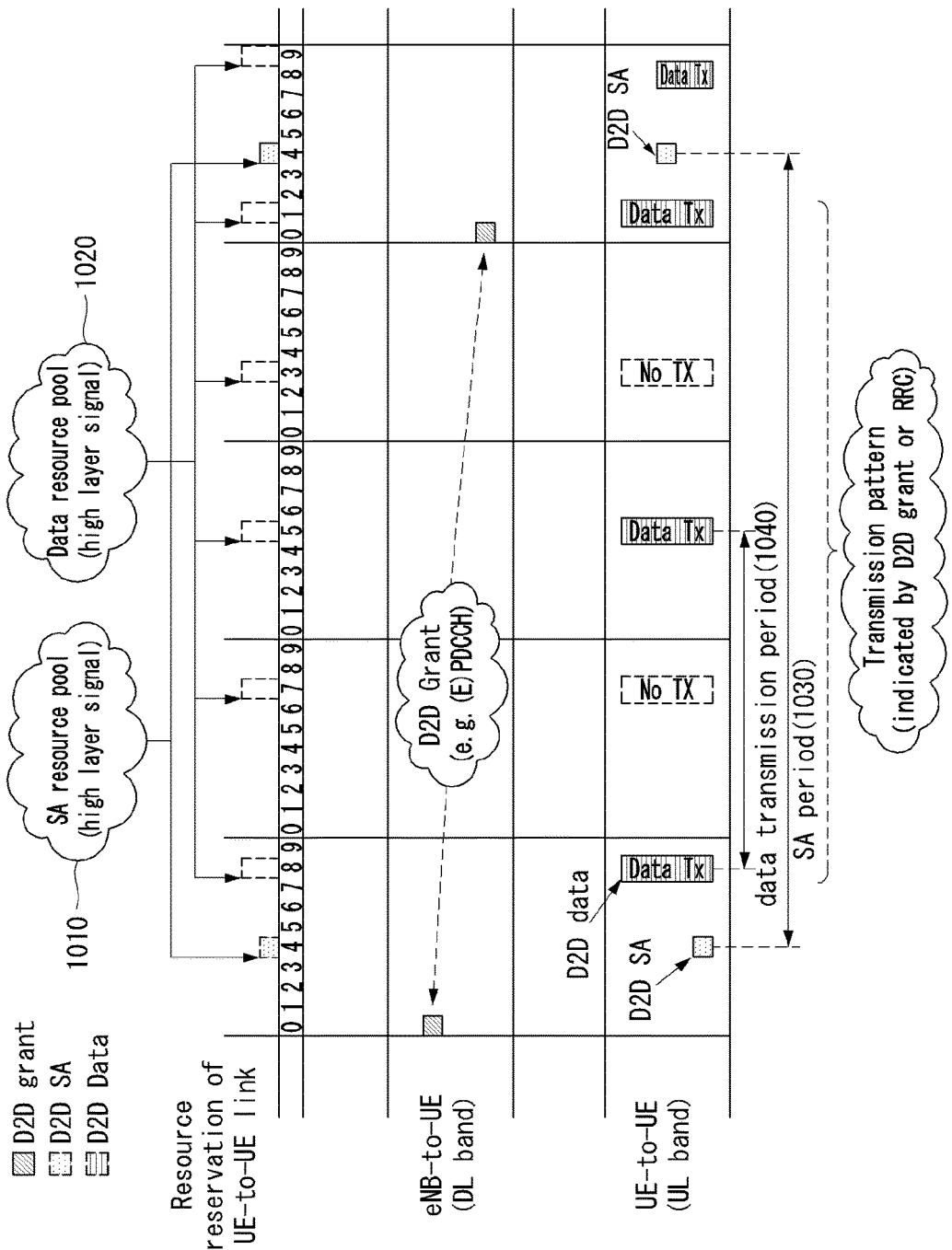

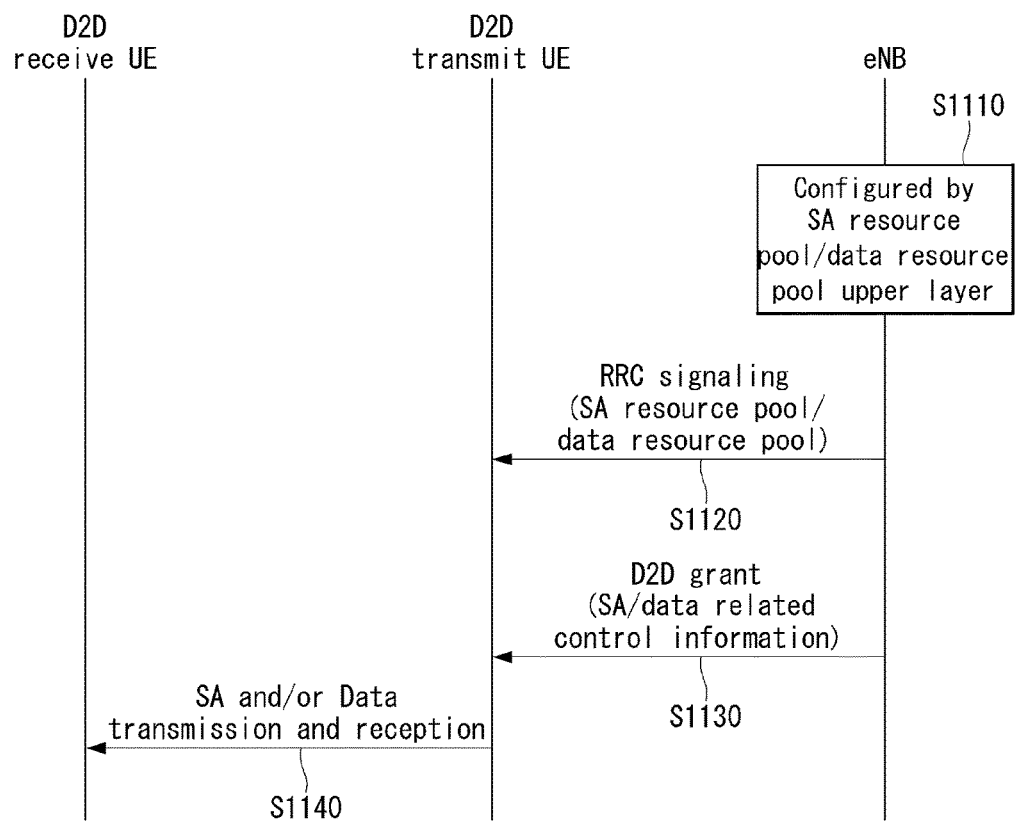
[FIG. 11]

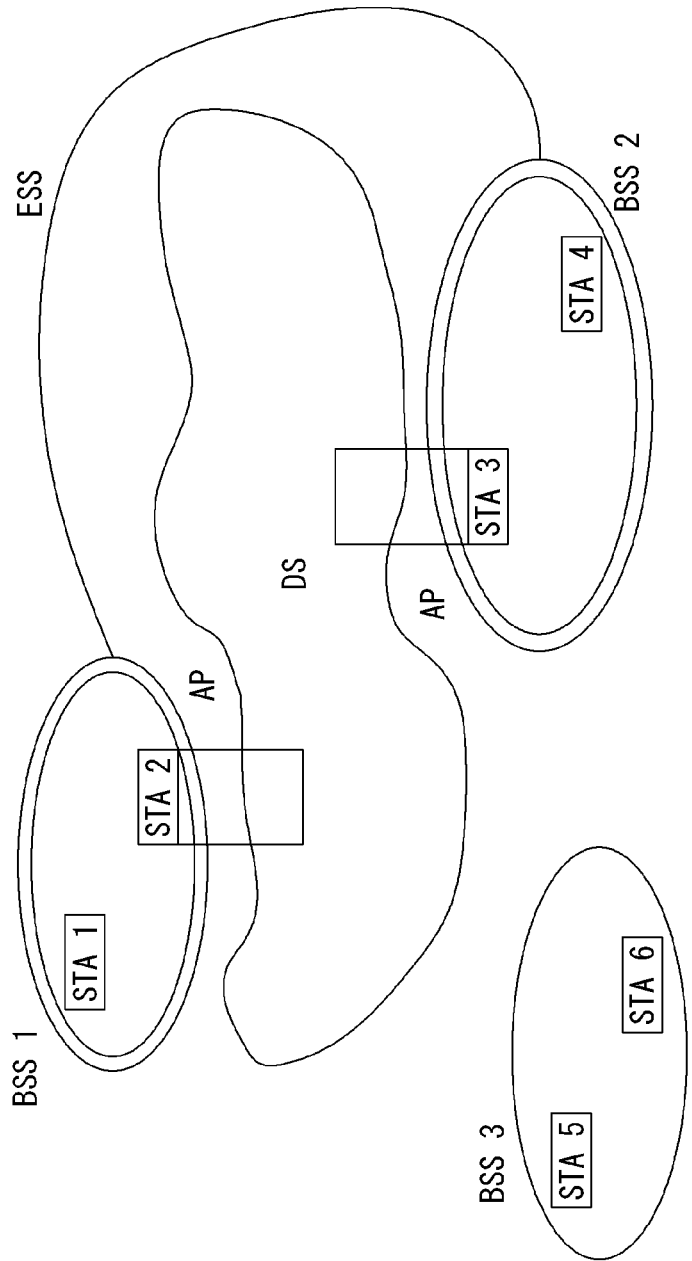
[FIG. 12]

[FIG. 13]
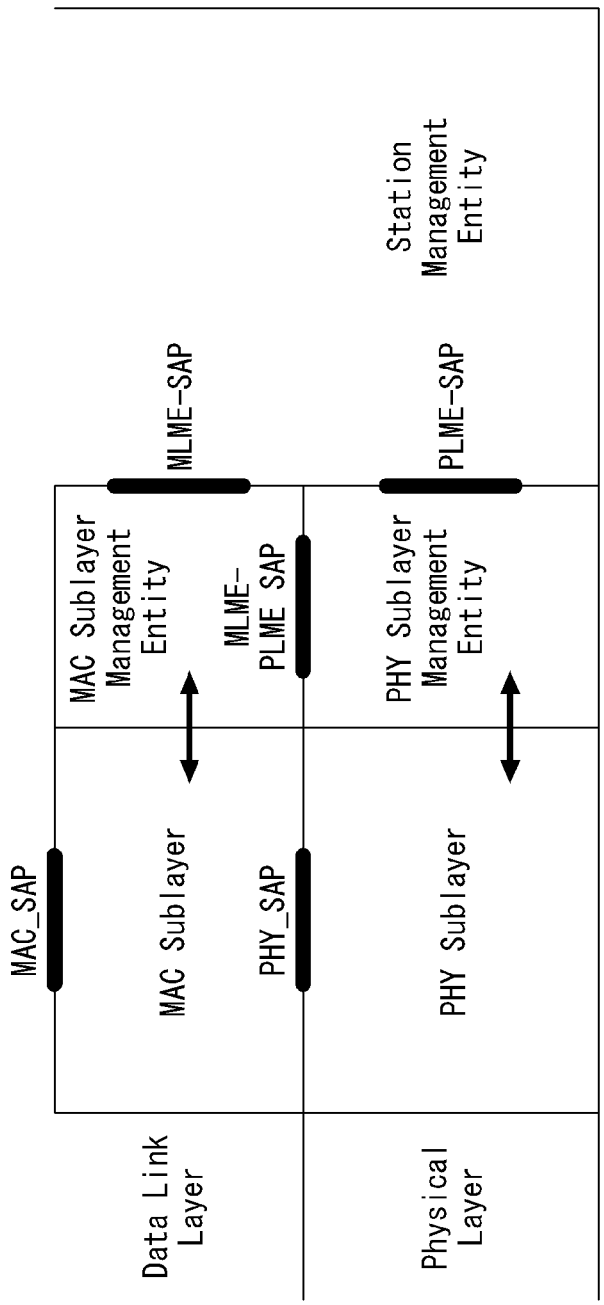

[FIG. 14]
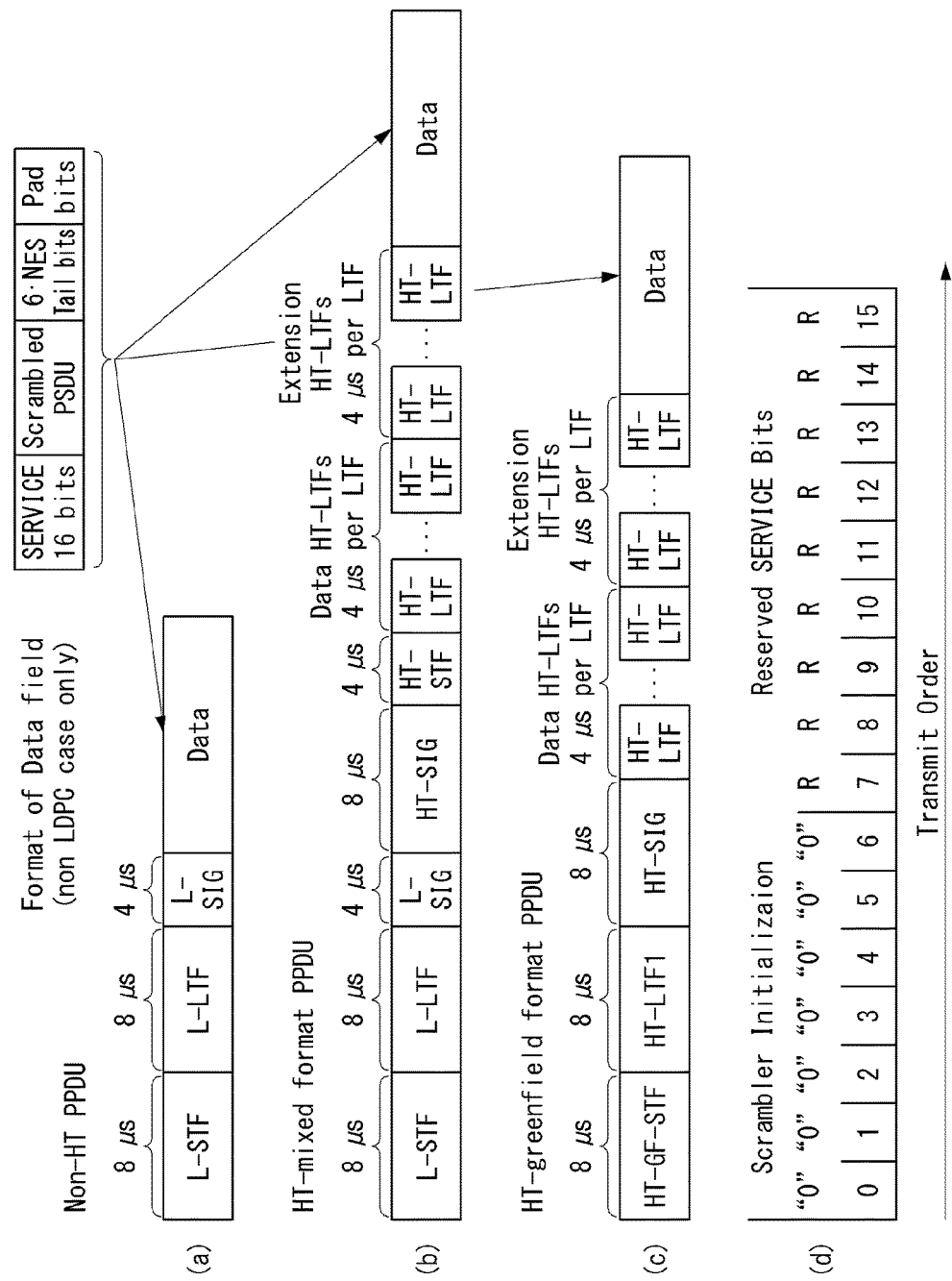

[FIG. 15]
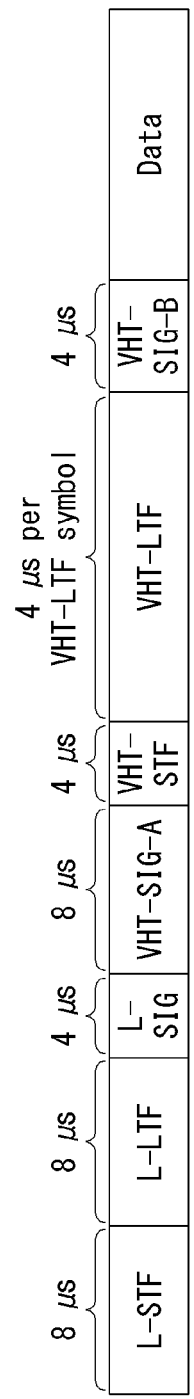

[FIG. 16]
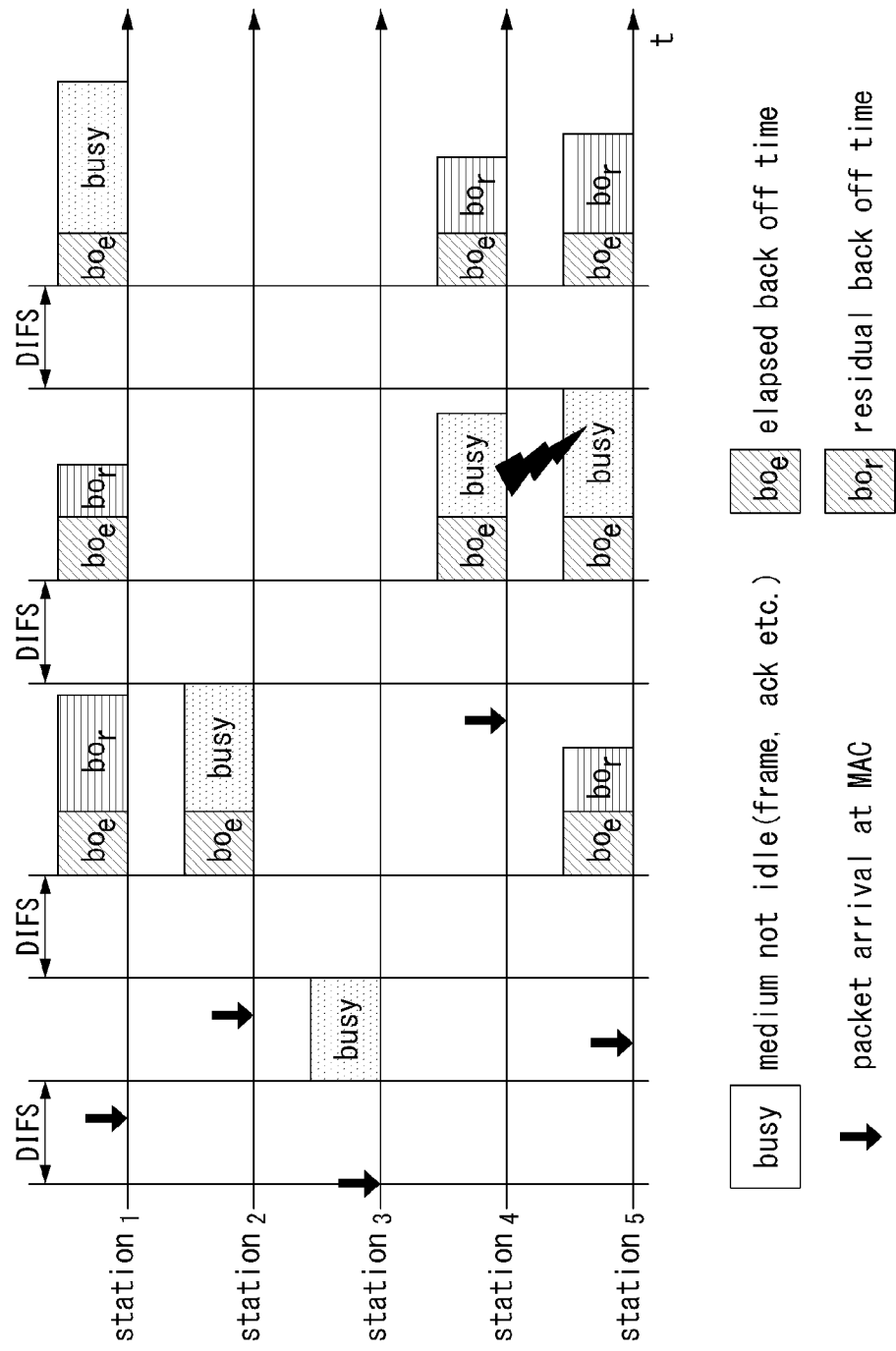

[FIG. 17]
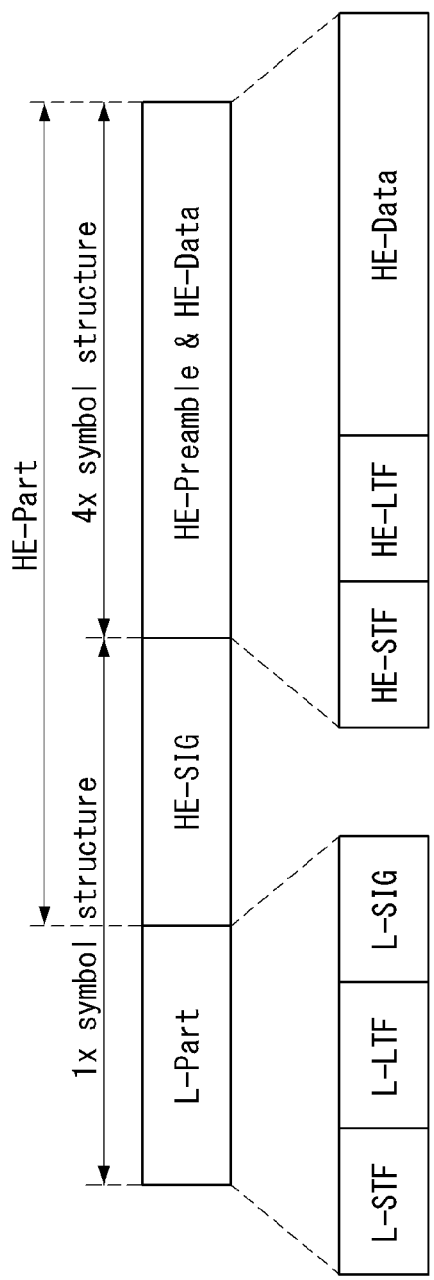

[FIG. 18]
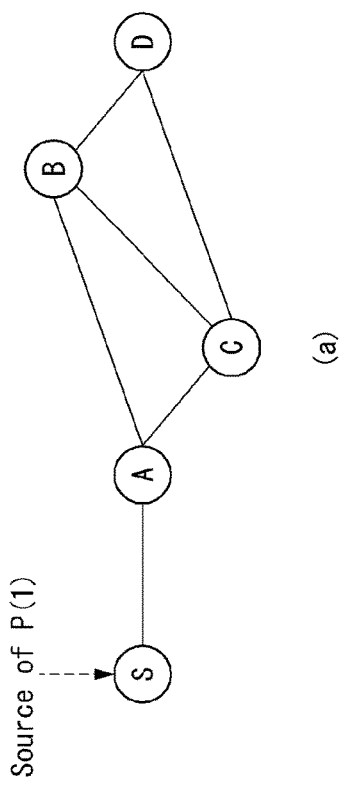
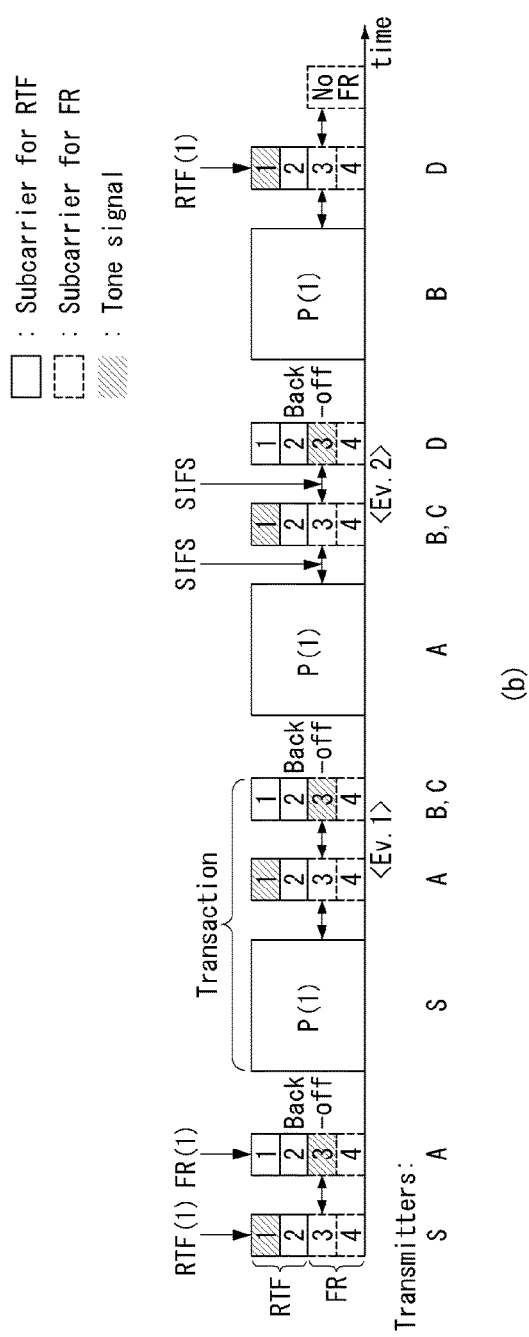

[FIG. 19]
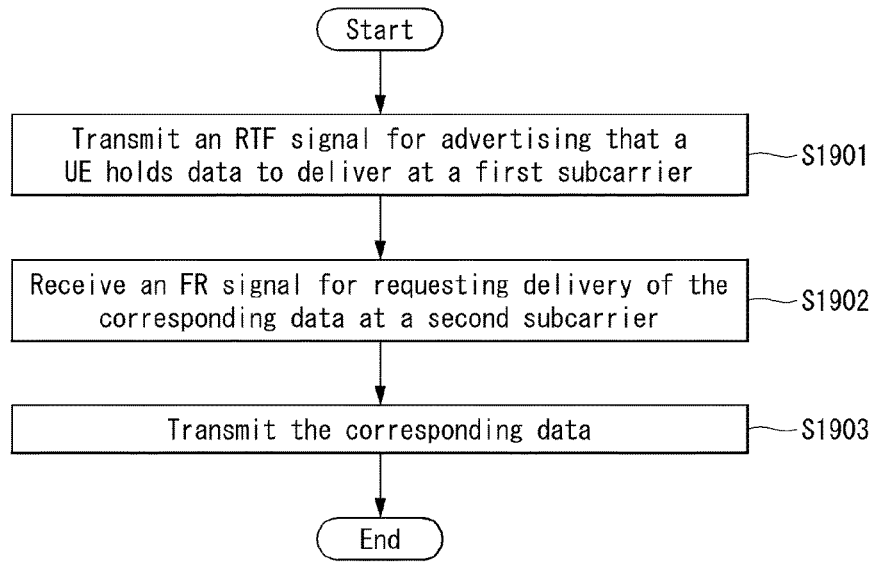
[FIG. 20]
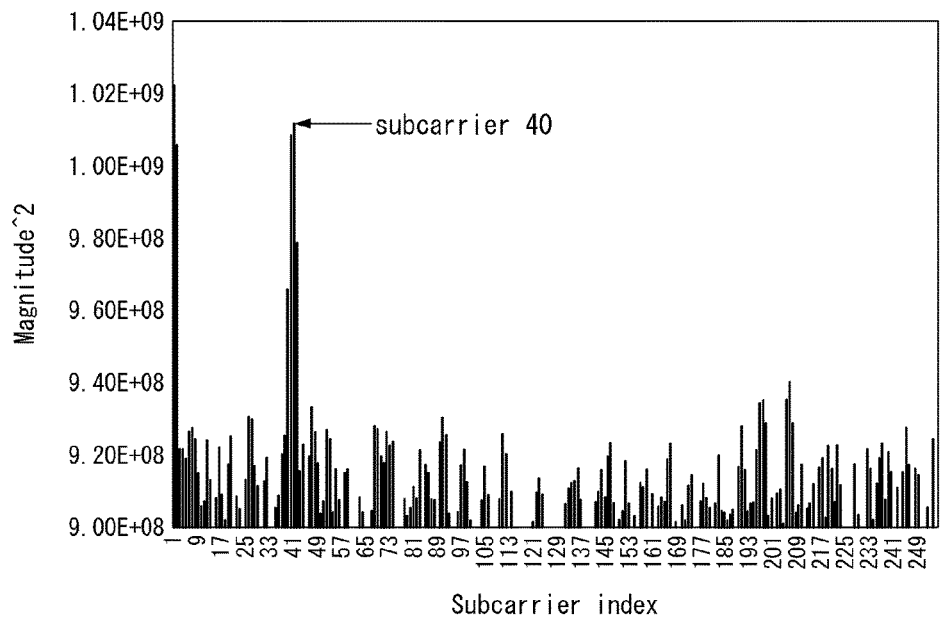

[FIG. 21]
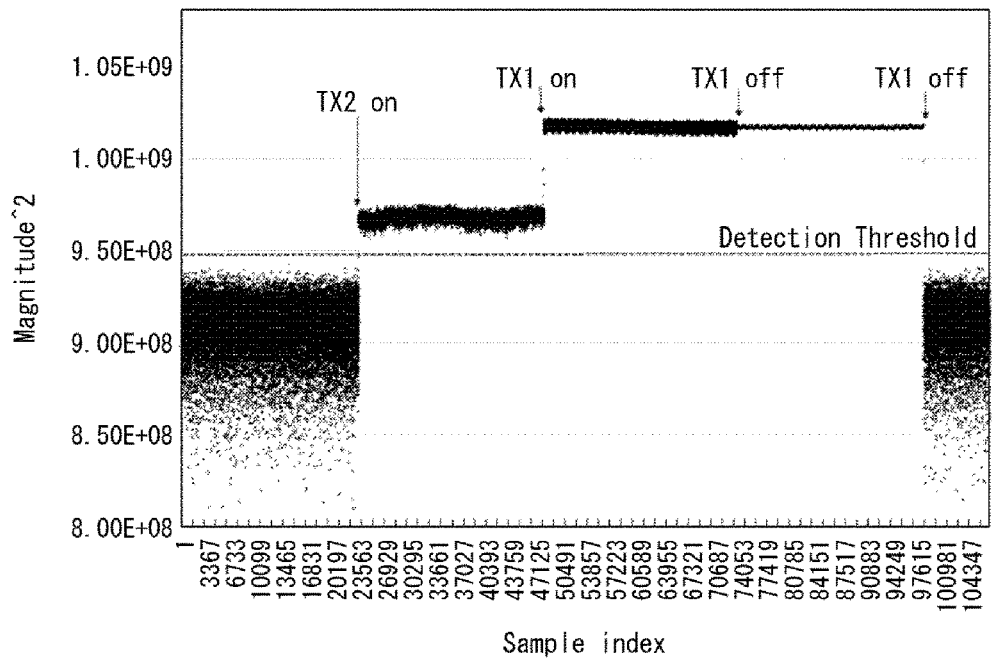
[FIG. 22]
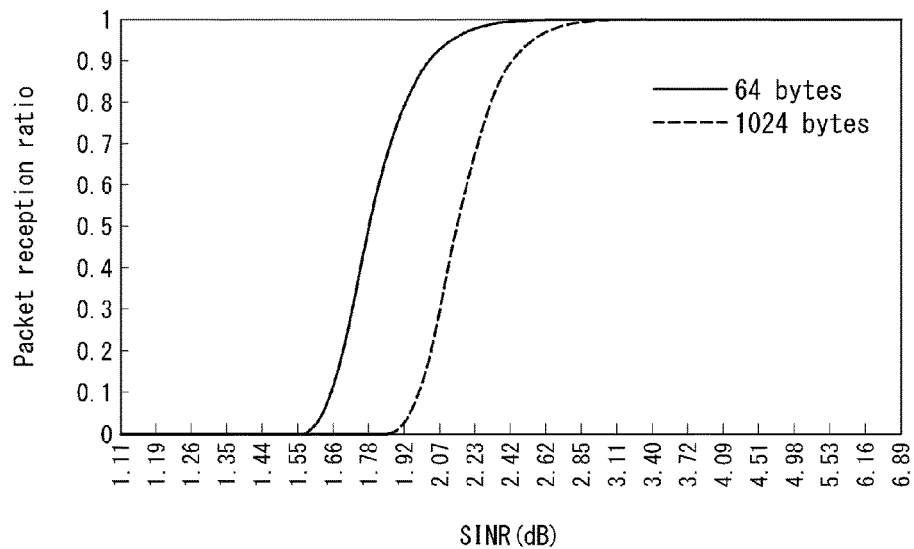

[FIG. 23]
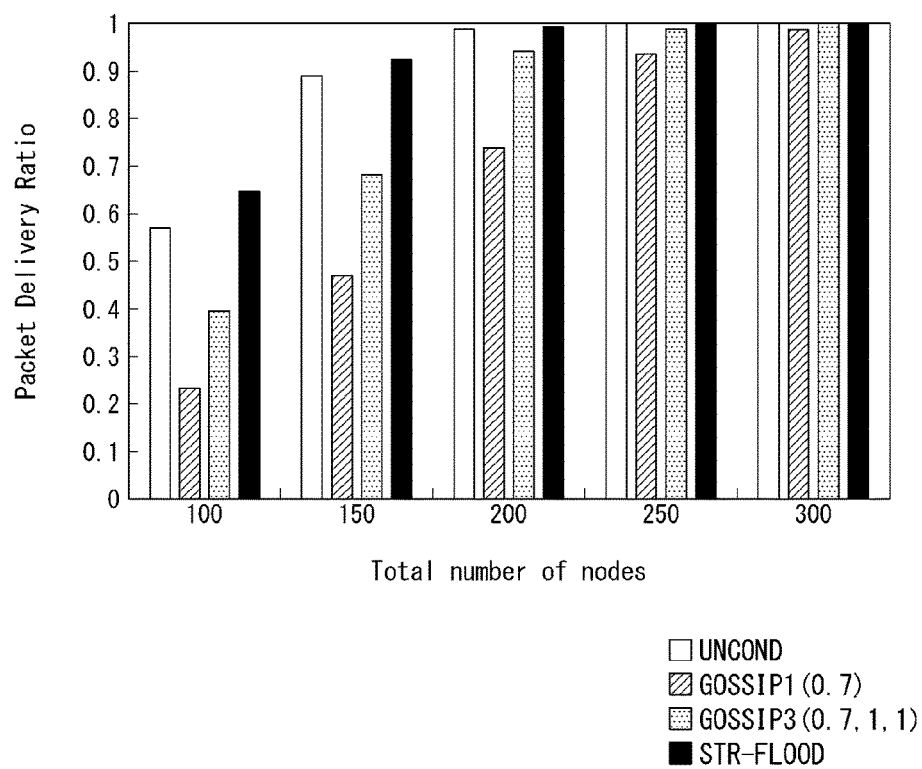

[FIG. 24]
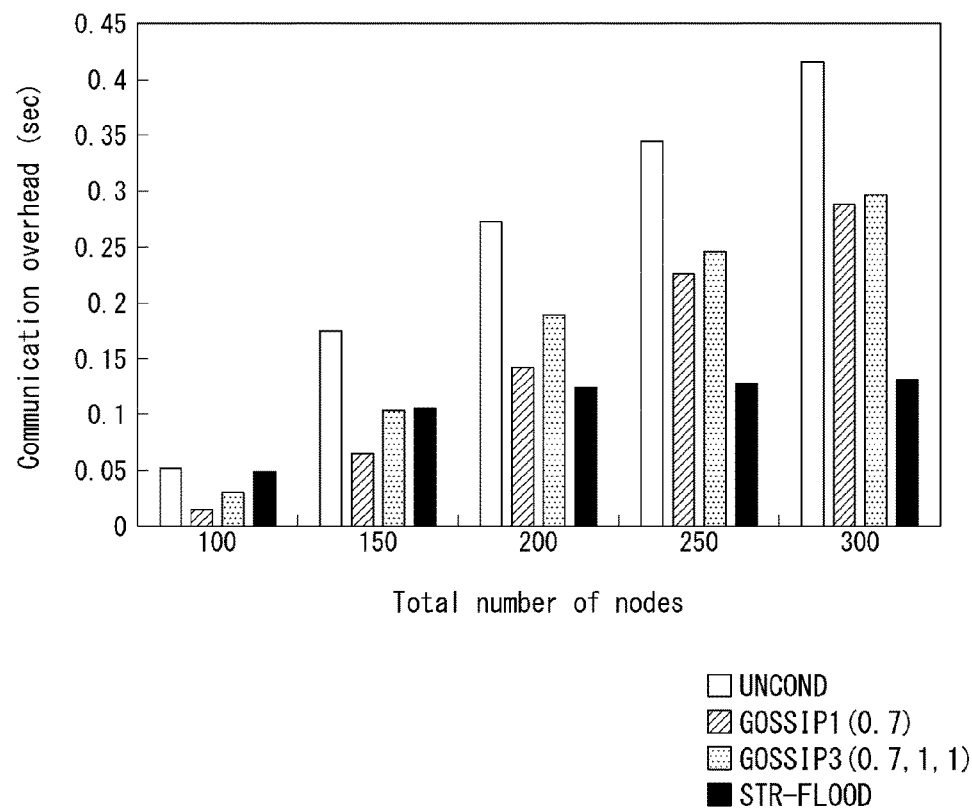

[FIG. 25]
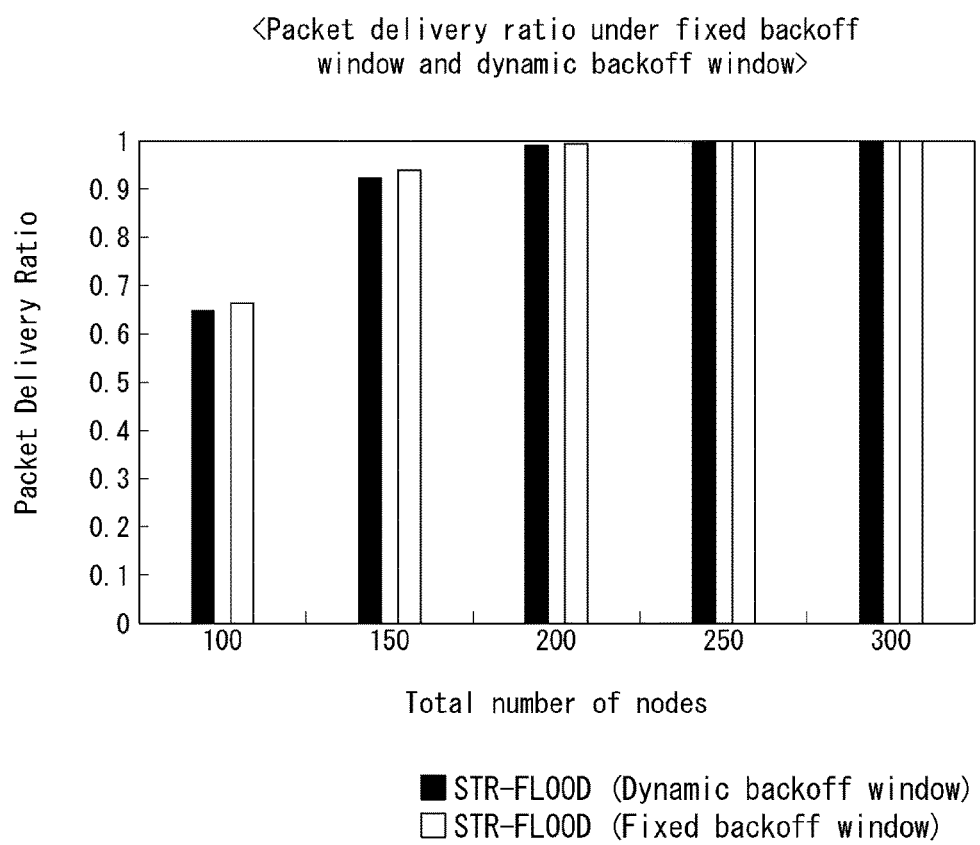

[FIG. 26]
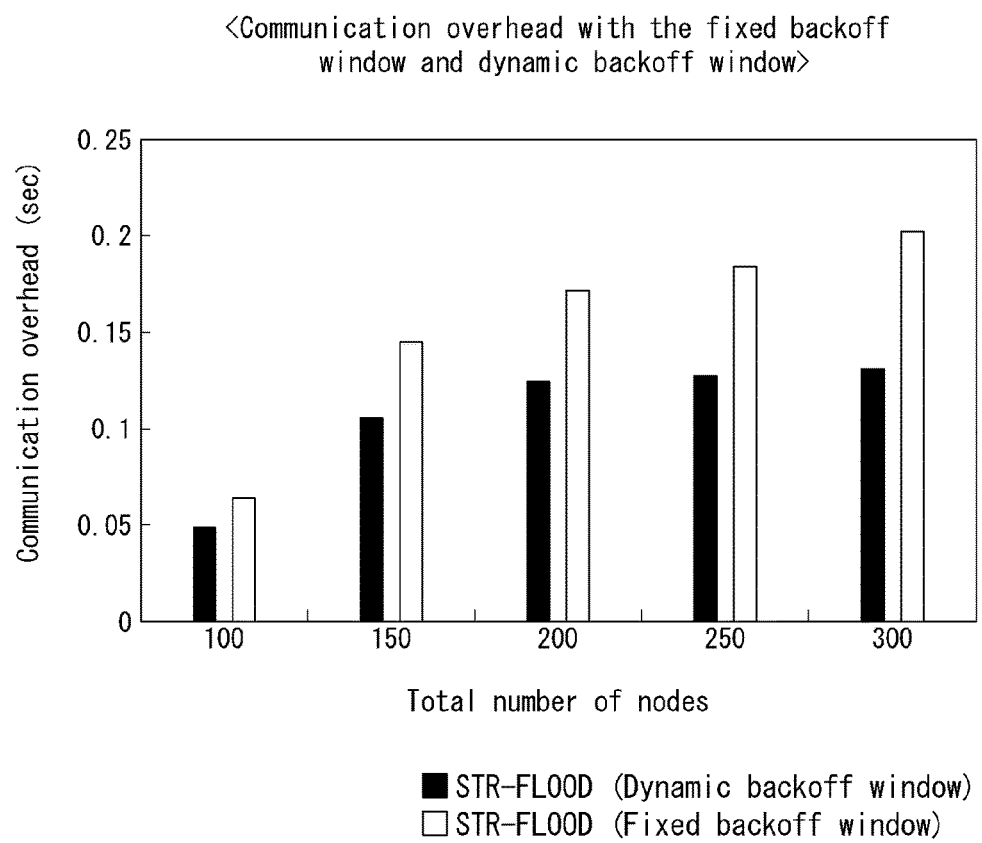

[FIG. 27]
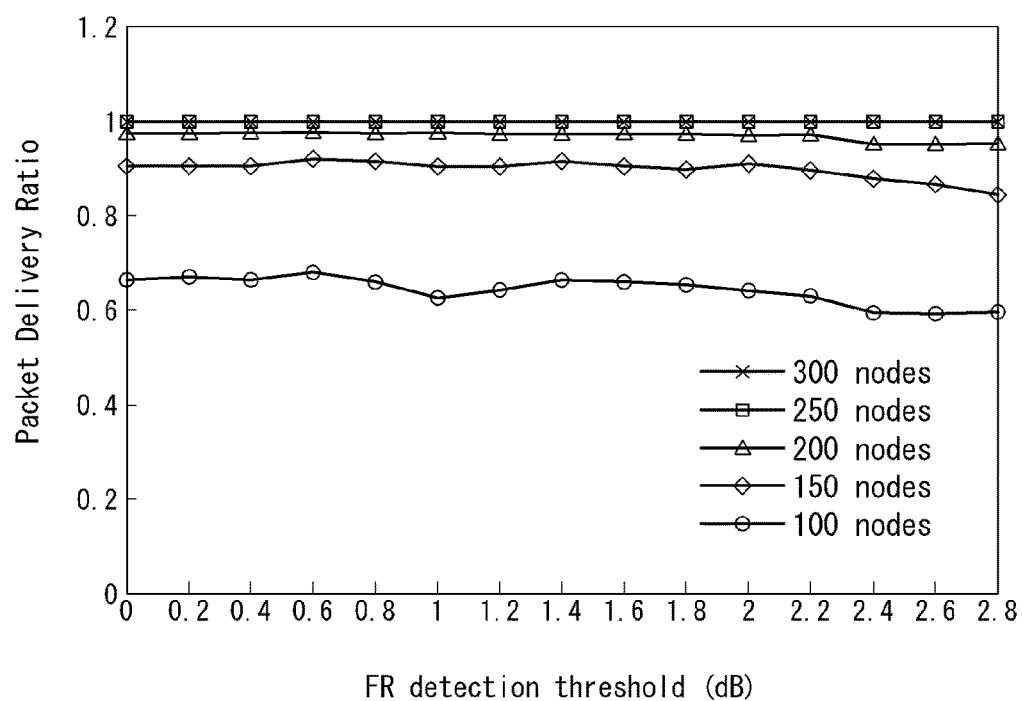

[FIG. 28]
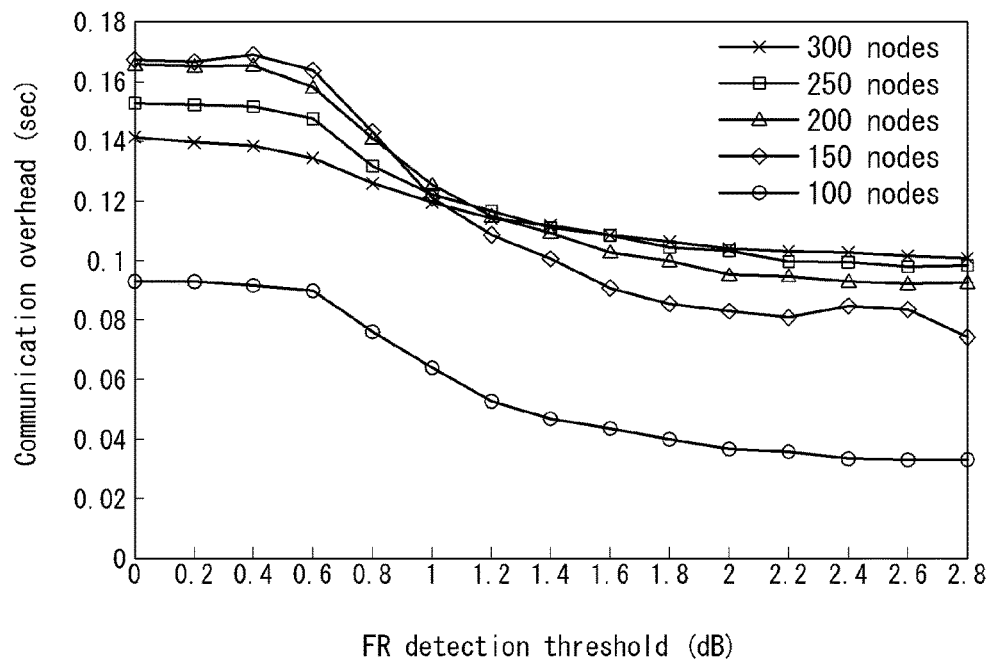

[FIG. 29]
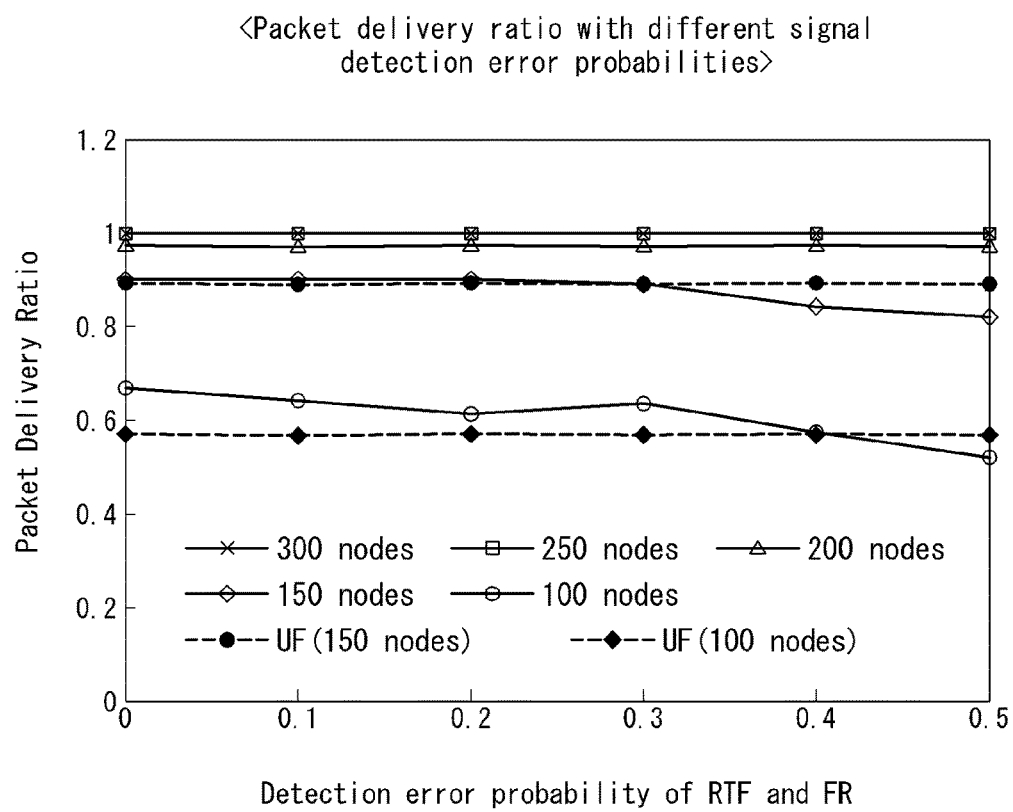

[FIG. 30]
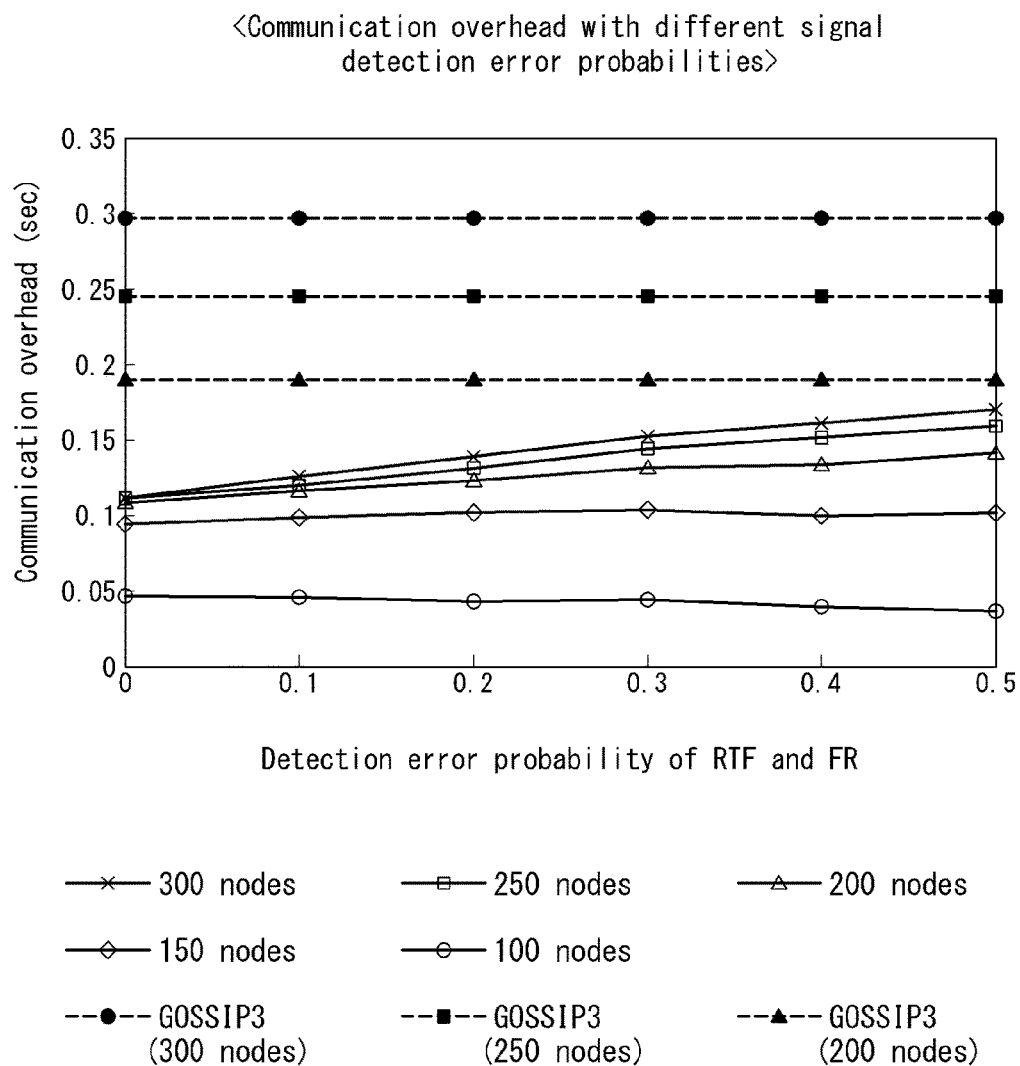

[FIG. 31]
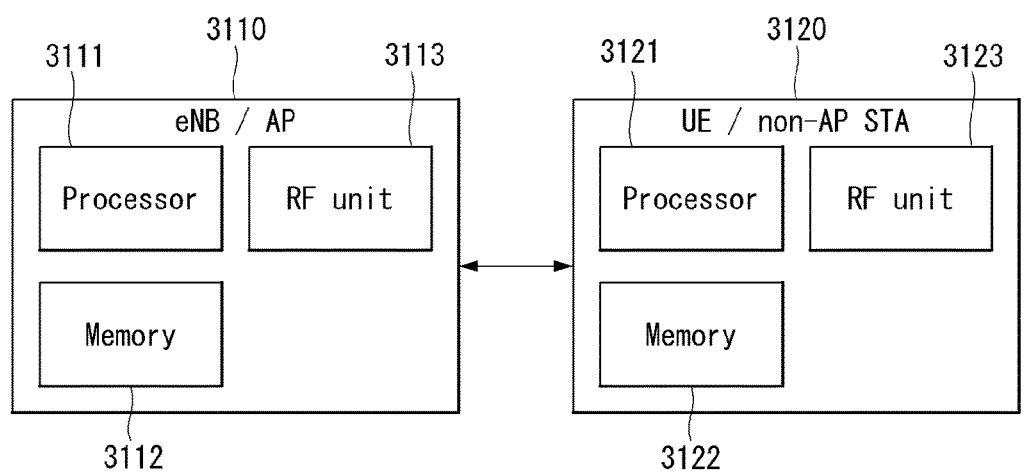

METHOD FOR TRANSFERRING DATA IN WIRELESS COMMUNICATION SYSTEM THAT SUPPORTS DEVICE-TO-DEVICE COMMUNICATION, AND APPARATUS THEREFOR

CROSS-REFERENCE TO RELATED APPLICATIONS

This application is the National Stage filing under 35 U.S.C. 371 of International Application No. PCT/KR2015/011302, filed on Oct. 26, 2015, which claims the benefit of U.S. Provisional Application No. 62/161,896, filed on May 15, 2015, the contents of which are all hereby incorporated by reference herein in their entirety.

TECHNICAL FIELD

The present invention is related to a wireless communication system and more specifically, a method for transferring (namely flooding) data (or packets) between devices in a wireless communication system supporting D2D (Device-to-Device) communication and an apparatus supporting the method.

BACKGROUND ART

A mobile communication system has been developed to provide a voice service while guaranteeing activity of a user. However, the mobile communication system extends an area up to a data service as well as a voice and at present, a short phenomenon of a resource is caused due to an explosive increase of traffic and uses require a higher-speed service, and as a result, a more developed mobile communication system is required.

Requirements of a next-generation mobile communication system largely need to support accommodation of explosive data traffic, an epochal increase of transmission rate per user, accommodation of the significantly increased number of connection devices, very low end-to-end latency, and high energy efficiency. To this end, various technologies have been researched, which include dual connectivity, massive multiple input multiple output (MIMO), in-band full duplex, non-orthogonal multiple access (NOMA), super wideband supporting, device networking, and the like.

DISCLOSURE

Technical Problem

An object of the present invention is to provide a method for transferring (namely flooding) data between devices in a wireless communication system supporting D2D communication.

Also, an object of the present invention is to provide a method for flooding data between devices on the basis of a control signal of subcarrier (or tone) level.

Technical objects of the present invention are not limited to the above-described object and other technical objects that have not been described above will become evident to those skilled in the art from the following description.

Technical Solution

According to one aspect of the present invention, a method for a user equipment (UE) to perform data transfer in a wireless communication system that supports device-to-device communication comprises broadcasting an Ready-To-Forward (RTF) signal on a first sub-carrier for advertising that the UE holds data to transfer; receiving an Forward-Request (FR) signal on a second sub-carrier for requesting transfer of the data from another UE; and broadcasting the data after a predetermined time, wherein the first sub-carrier and the second sub-carrier are determined on the basis of sequence numbers of the data, respectively.

According to another aspect of the present invention, a UE performing data transfer in a wireless communication system that supports device-to-device communication comprises an Radio Frequency (RF) unit for transmitting and receiving a radio signal and a processor controlling the RF unit, wherein the processor is configured to broadcast an Ready-To-Forward (RTF) signal on a first sub-carrier for advertising that the UE holds data to transfer; to receive an Forward-Request (FR) signal on a second sub-carrier for requesting transfer of the data from another UE; and to broadcast the data after a predetermined time, wherein the first sub-carrier and the second sub-carrier are determined on the basis of sequence numbers of the data, respectively.

Preferably, the predetermined time may be determined on the basis of received strength of an FR signal for the data.

Preferably, when the UE receives an RTF signal for the data from another node for the predetermined time period on the first sub-carrier, transfer of the data may be cancelled.

Preferably, when the UE receives an FR signal for the data from another node for the predetermined time period on the second sub-carrier, transfer of the data may be rescheduled.

Preferably, the entire sub-carriers in system bandwidth are divided into a first sub-carrier group for RTF signal transmission and a second sub-carrier group for FR signal transmission, and the first sub-carrier is determined from the first sub-carrier group, and the second sub-carrier is determined from the second sub-carrier group.

Preferably, when the UE receives an RTF signal for the data from another UE, the method may further comprise broadcasting an FR signal for the data on the second sub-carrier and receiving the data.

Preferably, when the UE receives an RTF signal for the data from another UE, a sequence number of the data may be added to a data request list of the device.

Preferably, when the UE receives the data or does not receive the data for a predetermined time period, the sequence number of the data may be removed from the data request list.

Preferably, when the UE receives the data, the sequence number of the data may be added to a data transfer list of the UE.

Preferably, the sequence number of the data may be removed from the data transfer list after a predetermined time period.

Preferably, when the UE does not receive the data for a predetermined time period after transmitting the FR signal for the data, the FR signal for the data may be re-broadcasted.

Preferably, when the FR signal is re-broadcasted more than a predetermined number of times, reception of the data may be given up.

Advantageous Effects

According to an embodiment of the present invention, data (or packets) flooding may be performed reliably among devices in a wireless communication system supporting D2D communication.

Also, according to an embodiment of the present invention, a delivery ratio may be improved in a wireless communication system supporting D2D communication.

Also, according to an embodiment of the present invention, communication overhead required for flooding data in a wireless communication system supporting D2D communication may be minimized.

The technical effects of the present invention are not limited to the above-described effects and other technical effects that have not been described above will be evidently understood by those skilled in the art from the following description.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

FIG. 1 shows an example of the configuration of an evolved universal terrestrial radio access network (E-UTRAN) to which an embodiment of the present invention may be applied.

FIG. 2 is a diagram for illustrating physical channels used in 3GPP LTE/LTE-A systems to which an embodiment of the present invention may be applied and a common signal transmission method using the physical channels.

FIG. 3 shows the structure of a radio frame in a wireless communication system to which an embodiment of the present invention may be applied.

FIG. 4 is a diagram illustrating a resource grid for a single downlink slot in a wireless communication system to which an embodiment of the present invention may be applied.

FIG. 5 shows the structure of a downlink subframe in a wireless communication system to which an embodiment of the present invention may be applied.

FIG. 6 shows the structure of an uplink subframe in a wireless communication system to which an embodiment of the present invention may be applied.

FIG. 7 is a diagram for conceptually illustrating D2D communication in a wireless communication system to which an embodiment of the present invention may be applied.

FIG. 8 shows an example of various scenarios of D2D communication to which a method proposed by this specification may be applied.

FIG. 9 is a diagram for illustrating a distributed discovery resource allocation method in a wireless communication system to which an embodiment of the present invention may be applied.

FIG. 10 is a diagram for illustrating a signaling transmission/reception method for D2D direct communication in a wireless communication system to which an embodiment of the present invention may be applied.

FIG. 11 is a diagram for illustrating a method for transmitting downlink control information for D2D direct communication in a wireless communication system to which an embodiment of the present invention may be applied.

FIG. 12 illustrates one example of the IEEE 802.11 system to which the present invention may be applied.

FIG. 13 illustrates a structure of layer architecture of the IEEE 802.11 system to which the present invention may be applied.

FIG. 14 illustrates a non-HT format PPDU and HT format PPDU of a wireless communication system to which the present invention may be applied.

FIG. 15 illustrates a VHT format PPDU of a wireless communication system to which the present invention may be applied.

FIG. 16 illustrates a random backoff period and a frame transfer procedure in a wireless communication system to which the present invention may be applied.

FIG. 17 illustrates an HE (High Efficiency) format PPDU according to one embodiment of the present invention.

FIG. 18 illustrates a protocol operation for subcarrier-level tone signaling according to one embodiment of the present invention.

FIG. 19 illustrates a data transfer method according to one embodiment of the present invention.

FIGS. 20 and 21 illustrate tone signal generation and an experimental result of tone signal detection in a data flooding method according to one embodiment of the present invention.

FIGS. 22 to 30 illustrate a simulation result of a data flooding method according to one embodiment of the present invention.

FIG. 31 illustrates a block diagram of a wireless communication device according to one embodiment of the present invention.

BEST MODE

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

in order to clearly describe the present invention, 3GPP LTE/LTE-A is primarily described, but a technical feature of the present invention is not limited thereto.

General System to which Present Invention can be Applied

FIG. 1 illustrates an example of the network structure of E-UTRAN (evolved universal terrestrial radio access network) to which the present invention may be applied.

An E-UTRAN system is an advanced version of the existing UTRAN system, and may be a 3GPP LTE/LTE-A system, for example. E-UTRAN consists of eNBs that provide a control plane protocol and a user plane protocol to UEs, and the eNBs are connected via the X2 interface. The X2 user plane interface X2-U is defined between the eNBs. The X2-U interface provides non-guaranteed delivery of user plane PDUs (packet data units). The X2 control plane interface X2-CP is defined between two neighbor eNBs. The X2-CP performs the following functions: context transfer between eNBs, control of user plane tunnels between a source eNB and a target eNB, transfer of handover-related messages, uplink load management and the like. An eNB is connected to user equipment UE through a radio interface and is connected to an Evolved Packet Core (EPC) through the S1 interface. The S1 user plane interface (SI-U) is defined between the eNB and the serving gateway (S-GW). The SI control plane interface (SI-MME) is defined between the eNB and the MME (Mobility Management Entity). The S1 interface performs the following functions: EPS (Enhanced Packet System) Bearer Service Management function, NAS (Non-Access Stratum) Signaling Transport function, Network Sharing Function, MME Load balancing Function and the like. The S1 interface supports many-to-many relations between eNBs and MMEs/S-GWs.

FIG. 2 illustrates physical channels and a view showing physical channels used for in the 3GPP LTE/LTE-A system to which the present invention can be applied.

When a UE is powered on or when the UE newly enters a cell, the UE performs an initial cell search operation such as synchronization with a BS in step S201. For the initial cell search operation, the UE may receive a Primary Synchronization Channel (P-SCH) (or Primary Synchronization Signal (PSS)) and a Secondary Synchronization Channel (S-SCH) (or Secondary Synchronization Signal (SSS)) from the BS so as to perform synchronization with the BS, and acquire information such as a cell ID.

Thereafter, the UE may receive a physical broadcast channel (PBCH) from the BS and acquire broadcast information in the cell. Meanwhile, the UE may receive a Downlink Reference signal (DL RS) in the initial cell search step and confirm a downlink channel state.

The UE which completes the initial cell search may receive a Physical Downlink Control Channel (PDCCH) and a Physical Downlink Shared Channel (PDSCH) corresponding to the PDCCH, and acquire more detailed system information in step S202.

Thereafter, the UE may perform a random access procedure in steps S203 to S206, in order to complete the access to the BS. For the random access procedure, the UE may transmit a preamble via a Physical Random Access Channel (PRACH) (S203), and may receive a message in response to the preamble via the PDCCH and the PDSCH corresponding thereto (S204). In contention-based random access, a contention resolution procedure including the transmission of an additional PRACH (S205) and the reception of the PDCCH and the PDSCH corresponding thereto (S206) may be performed.

The UE which performs the above-described procedure may then receive the PDCCH/PDSCH (S207) and transmit a Physical Uplink Shared Channel (PUSCH)/Physical Uplink Control Channel (PUCCH) (S208), as a general uplink/downlink signal transmission procedure.

Control information transmitted from the UE to the BS is collectively referred to as uplink control information (UCI). The UCI includes hybrid automatic repeat and request acknowledgement/negative-acknowledgement (HARQ ACK/NACK), scheduling request (SR), channel quality information (Cal), precoding matrix indicator (PMI), rank indication (RI), etc. In the embodiments of the present invention, CQI and/or PMI are also referred to as channel quality control information.

In general, although a UCI is periodically transmitted via a PUCCH in the LTE system, this may be transmitted through a PUSCH if control information and traffic data are simultaneously transmitted. In addition, a UCI may be aperiodically transmitted via a PUSCH according to a network request/instruction.

FIG. 3 illustrates the structure of a radio frame in a wireless communication system to which an embodiment of the present invention can be applied.

3GPP LTE/LTE-A support a radio frame structure type 1 which may be applicable to Frequency Division Duplex (FDD) and a radio frame structure which may be applicable to Time Division Duplex (TDD).

FIG. 3(a) illustrates the radio frame structure type 1. A radio frame consists of 10 subframes. One subframe consists of 2 slots in a time domain. The time taken to send one subframe is called a Transmission Time Interval (TTI). For example, one subframe may have a length of 1 ms, and one slot may have a length of 0.5 ms.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 3(b) illustrates the frame structure type 2. The radio frame structure type 2 consists of 2 half frames. Each of the half frames consists of 5 subframes, a Downlink Pilot Time Slot (DwPTS), a Guard Period (GP), and an Uplink Pilot Time Slot (UpPTS). One subframe consists of 2 slots. The DwPTS is used for initial cell search, synchronization, or channel estimation in UE. The UpPTS is used for channel estimation in an eNB and to perform uplink transmission synchronization with UE. The guard period is an interval in which interference generated in uplink due to the multi-path delay of a downlink signal between uplink and downlink is removed.

The structure of a radio frame is only one example. The number of subcarriers included in a radio frame or the number of slots included in a subframe and the number of OFDM symbols included in a slot may be changed in various ways.

FIG. 4 is a diagram illustrating a resource grid for one downlink slot in a wireless communication system to which an embodiment of the present invention can be applied.

Referring to FIG. 4, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs N˙DL included in a downlink slot depends on a downlink transmission bandwidth.

The structure of an uplink slot may be the same as that of a downlink slot.

FIG. 5 illustrates the structure of a downlink subframe in a wireless communication system to which an embodiment of the present invention can be applied.

Referring to FIG. 5, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a high layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 6 illustrates the structure of an uplink subframe in a wireless communication system to which an embodiment of the present invention can be applied.

Referring to FIG. 6, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Device-to-Device (D2D) Communication

A Device-to-Device (D2D) communication technology means a scheme in which terminals which are geographically proximate to each other directly communicate with each other without using an infrastructure such as the base station. As the D2D communication technology, technologies primarily using an unlicensed frequency band have been developed, such as Wi-Fi Direct and Bluetooth. However, development and standardization of the D2D communication technology using a licensed frequency band are in progress for the purpose of improving frequency use efficiency of a cellular system.

In general, the D2D communication as a term which denotes communication between things or the M2M communication is limitedly used, but the D2D communication in the present invention may include all of communication among various types of devices having a communication function, such as a smart phone or a personal computer in addition to a simple device having the communication function.

FIG. 7 is a diagram for conceptually describing D2D communication in the wireless communication system to which the present invention can be applied.

FIG. 10(a) illustrates a base station based communication scheme in the related art and terminal 1 (UE 1) may transmit data to the base station on the uplink and the base station may transmit data to terminal 2 (UE 2) on the downlink. The communication scheme may be referred to as an indirect communication scheme through the base station. In the indirect communication scheme, a Un link (as a link between the base stations or a link between the base station and a repeater, may be referred to as a backhaul link) which is a link defined in a wireless communication system in the related art and/or a Un link (as a link between the base station and the terminal or a link between the repeater and the terminal, may be referred to as an access link) may be associated.

FIG. 7(b) as one example of the D2D communication illustrates a UE-to-UE communication scheme and UE-to-UE data exchange may be performed without using the base station. The communication scheme may be referred to as a direct communication scheme between the devices. The D2D direct communication scheme has advantages including a decrease in latency, use of less radio resources, and the like as compared with the indirect communication scheme through the base station.

FIG. 8 illustrates one example of various scenarios of D2D communication to which a method proposed by the present specification can be applied.

A scenario of the D2D communication may be largely divided into (1) an Out-of-coverage network, (2) a partial-coverage network, and (3) an in-coverage network according to whether UE 1 and UE 2 are positioned in coverage/out of coverage.

The case of the in-coverage network may be divided into an in-coverage-single-cell and an in-coverage-multi-cell according to the number of cells corresponding to the coverage of the base station.

FIG. 8(a) illustrates one example of an Out-of-coverage network scenario of the D2D communication.

An out-of-coverage network scenario represents D2D communication between D2D terminals without control of the base station.

In FIG. 8(a), it may be illustrated that only UE 1 and UE 2 are present and UE 1 and UE 2 perform direct communication.

FIG. 8(b) illustrates one example of a partial-coverage network scenario of the D2D communication.

The partial-coverage network scenario represents performing the D2D communication between the D2D terminal positioned in the network coverage and the D2D terminal positioned out of the network coverage.

In FIG. 8(b), it may be illustrated that UE 1 positioned in the network coverage and UE 2 positioned out of the network coverage communicate with each other.

FIG. 8(c) illustrates one example of an in-coverage-single-cell scenario and FIG. 8(d) illustrates one example of an in-coverage-multi-cell scenario.

The in-coverage network scenario represents that the D2D terminals perform the D2D communication through the control of the base station in the network coverage.

In FIG. 8(c), UE 1 and UE 2 are positioned within the same network coverage (alternatively, cell) and perform the D2D communication under the control of the base station.

In FIG. 8(d), UE 1 and UE 2 are positioned in the network coverage, but positioned in different network coverage. In addition, UE 1 and UE 2 perform the D2D communication under the control of the base station managing each network coverage.

Hereinafter, the D2D communication will be described in more detail.

The D2D communication may operate in the scenario illustrated in FIG. 8, but in general, the D2D communication may operate in the coverage and out of the coverage. A link used for the D2D communication (UE-to-UE direct communication) may be referred to as D2D link, direct link, or sidelink, but hereinafter, the link used for the D2D communication will be collectively called and described as the sidelink for easy description.

Sidelink transmission may operate in an uplink spectrum in the case of FDD and operate in an uplink (alternatively, downlink) subframe in the case of TDD. Time division multiplexing (TDM) may be used for multiplexing the sidelink transmission and uplink transmission.

The sidelink transmission and the uplink transmissions do not simultaneously occur. The sidelink subframe partially or totally overlapped with the uplink subframe or UpPTS used for the uplink transmission, the sidelink transmission does not occur. Further, sidelink transmission and reception do not also simultaneously occur.

In the case of a structure of a physical resource used for the sidelink transmission, a structure of an uplink physical resource may be similarly used. However, a last symbol of the sidelink subframe is constituted by a guard period not to be used for the sidelink transmission.

The sidelink subframe may be configured by an extended CP or a normal CP.

The D2D communication may be largely divided into discovery, direct communication, and synchronization.

1) Discovery

The D2D discovery may be applied in the network coverage (including Inter-cell and Intra-cell). In inter-cell discovery, both synchronous and asynchronous cell deployments may be considered. The D2D discovery may be used for various commercial purposes including advertisement, coupon issue, friend finding, and the like for a terminal within a proximate area.

When UE 1 plays a role of transmitting a discovery message, UE 1 transmits the discovery message and UE 2 receives the discovery message. Transmission and reception roles of UE 1 and UE 2 may be exchanged with each other. The discovery message transmitted from UE 1 may be received by one or more UE(s) such as UE 2.

The discovery message may include a single MAC PDU and herein, the single MAC PDU may include a UE identifier (ID) and an application ID.

As a channel for transmitting the discovery message, a physical sidelink discovery channel (PDSCH) may be defined. As a structure of the PDSCH, a PUSCH structure may be reused.

As a resource allocation method for the D2D discovery, two types (Type 1 and Type 2) may be used.

In the case of Type 1, the base station may allocate a resource for transmitting the discovery message by a non-UE specific scheme.

In detail, a radio resource pool for discovery transmission and reception constituted by a plurality of subframe sets and a plurality of resource block sets is allocated within a specific period (hereinafter, referred to as 'discovery period') and discovery transmission UE arbitrarily selects a specific resource in the radio resource pool and thereafter, transmits the discovery message.

The periodic discovery resource pool may be allocated for transmitting a discovery signal by a semi-static scheme. Configuration information of the discovery resource pool for the discovery transmission includes the discovery period, subframe set and resource block set information which may be used for transmitting the discovery signal within the discovery period, and the like. The configuration information of the discovery resource pool may be transmitted to the UE by high layer signaling. In the case of in-coverage UE, the discovery resource pool for the discovery transmission may be configured by the base station and notified to the UE by using RRC signaling (e.g., a system information block (SIB)).

The discovery resource pool allocated for the discovery within one discovery period as a time-frequency resource block having the same size may be multiplexed by TDM and/or FDM and the time-frequency resource block having the same size may be referred to as 'discovery resource'. The discovery resource may be divided by the unit of one subframe and include two physical resource blocks (PRBs) per slot in each subframe. One discovery resource may be used for transmitting a discovery MAC PDU by one UE.

Further, the UE may repeatedly transmit the discovery signal within the discovery period for transmitting one transport block. The MAC PDU transmitted by one UE may be repeatedly (e.g., repeatedly four times) contiguously or non-contiguously within the discovery period (that is, the radio resource pool). The number of transmission times of the discovery signal for one transport block may be transmitted to the UE by the high layer signaling.

The UE may arbitrarily select a first discovery resource in a discovery resource set which may be used for repeated transmission of the MAC PDU and other discovery resources may be determined in association with the first discovery resource. For example, a predetermined pattern may be previously set and the next discovery resource may be determined according to the previously set pattern according to a position of the discovery resource which the UE first selects. Or, the UE may arbitrarily select each discovery resource in the discovery resource set which may be used for the repeated transmission of the MAC PDU.

In Type 2, the resource for transmitting the discover message is UE-specifically allocated. Type 2 is subdivided into Type 2A (Type-2A) and Type 2B (Type-2B). Type 2A is a scheme in which the base station allocates the resource every transmission instance of the discovery message within the discovery period and Type 2B is a scheme in which the base station allocates the resource by a semi-persistent scheme.

In the case of Type 2B, RRC_CONNECTED UE requests allocation of the resource for transmitting the D2D discovery message to the base station through the RRC signaling. In addition, the base station may allocate the resource through the RRC signaling. When the UE is transitioned to the RRC_IDLE state or when the base station withdraws the resource allocation through the RRC signaling, the UE release a transmission resource which is allocated most recently. As described above, in the case of Type 2B, the radio resource may be allocated by the RRC signaling and activation/deactivation of the radio resource allocated by the PDCCH may be determined.

The radio resource pool for receiving the discovery message may be configured by the base station and notified to the UE by using the RRC signaling (e.g., the system information block (SIB)).

The UE that receives the discovery message monitors both the discovery resource pools of Type 1 and Type 2 in order to receive the discovery message.

2) Direct Communication

An application area of the D2D direct communication includes even a network coverage edge-of-coverage area as well as network in-coverage and out-of-coverage areas. The D2D direct communication may be used for a purpose such as public safety, or the like.

When UE 1 plays a role of transmitting direct communication data, UE 1 transmits the direct communication data and UE 2 receives the direct communication data. Transmission and reception roles of UE 1 and UE 2 may be exchanged with each other. The direct communication transmission from UE 1 may be received by one or more UE(s) such as UE 2.

The D2D discovery and the D2D communication may not be associated with each other but independently defined. That is, in groupcast and broadcast direct communication, the D2D discovery is not required. As such, when the D2D discovery and the D2D direct communication are independently defined, the UEs need not recognize adjacent UE. In other words, in the case of the groupcast and broadcast direct communication, all receiving UEs in a group are not required to be proximate to each other.

As a channel for transmitting the D2D direct communication data, a physical sidelink shared channel (PSSCH) may be defined. Further, as a channel for transmitting control information (e.g., scheduling assignment (SA), a transmission format, and the like for transmitting the direct communication data) for the D2D direct communication, a physical sidelink control channel (PSCCH) may be defined. As the structures of the PSSCH and the PSCCH, the PUSCH structure may be reused.

As a resource allocation method for the D2D direct communication, two modes (mode 1 and mode 2) may be used.

Mode 1 represents a scheme in which the base station schedules a resource used for transmitting data or control information for the D2D direct communication to the UE. In the in-coverage, mode 1 is applied.

The base station configures the resource pool required for the D2D direct communication. Herein, the resource pool required for the D2D communication may be divided into a control information pool and a D2D data pool. When the base station schedules control information and D2D data transmission resources within a pool configured for transmitting D2D UE by using the PDCCH or ePDCCH, the transmitting D2D UE transmits control information and D2D data by using an allocated resource.

The transmitting UE requests a transmission resource to the base station and the base station schedules resources for transmitting the control information and the D2D direct communication data. That is, in the case of mode 1, the transmitting UE needs to be in the RRC_CONNECTED state in order to perform the D2D direct communication. The transmitting UE transmits the scheduling request to the base station and thereafter, the buffer status report (BSR) procedure is performed so that the base station determines the quantity of resources requested by the transmitting UE.

When receiving UEs monitor the control information pool and decodes control information associated therewith, the receiving UEs may selectively decode D2D data transmission associated with the corresponding control information. The receiving UE may not decode the D2D data pool according to a control information decoding result.

Mode 2 represents a scheme in which the UE arbitrarily selects a specific resource in the resource pool in order to transmit data or control information for the D2D direct communication. In the out-of-coverage and/or edge-of-coverage, mode 2 is applied.

In mode 2, the resource pool for transmitting the control information and/or the resource pool for transmitting the D2D direct communication data may be pre-configured or semi-statically configured. The UE receives the configured resource pool (a time and a frequency) and selects the resource for the D2D communication transmission. That is, the UE may select the resource for transmitting the control information in the control information resource pool in order to transmit the control information. Further, the UE may select the resource in the data resource pool in order to transmit the D2D direct communication data.

In D2D broadcast communication, the control information is transmitted by a broadcasting UE. The control information indicates explicitly and/or implicitly a position of a resource for data reception in association with the physical channel (that is, PSSCH) transporting the D2D direct communication data.

3) Synchronization

A D2D synchronization signal/sequence (D2DSS) may be used for the UE to acquire time-frequency synchronization. In particular, since the control of the base station is impossible out of the network coverage, a new signal and a new procedure for establishing UE-to-UE synchronization may be defined. The D2D synchronization signal/sequence (D2DSS) may be referred to as a sidelink synchronization signal.

A UE that periodically transmits the D2D synchronization signal/sequence (D2DSS) may be referred to as a D2D synchronization source or a sidelink synchronization source. When the D2D synchronization source is the base station, a structure of the D2D synchronization signal/sequence (D2DSS) may be the same as the PSS/SSS. When the D2D synchronization source is not the base station (for example, the UE or a global navigation satellite system (GNSS)), the structure of the D2D synchronization signal/sequence (D2DSS) may be newly defined.

The D2D synchronization signal/sequence (D2DSS) is periodically transmitted with a period which is not smaller than 40 ms. Each UE may have multiple physical-layer D2D synchronization identities. The physical-layer D2D synchronization identity may be referred to as a physical-layer sidelink synchronization identity or just referred to as a D2D synchronization identity.

The D2D synchronization signal/sequence (D2DSS) includes a D2D primary synchronization signal/sequence and a D2D secondary synchronization signal/sequence. The D2D primary synchronization signal/sequence and the D2D secondary synchronization signal/sequence may be referred to as a primary sidelink synchronization signal (PSSS) and a secondary sidelink synchronization signal (SSSS), respectively.

Before transmitting the D2D synchronization signal/sequence (D2DSS), the UE may first search the D2D synchronization source. In addition, when the D2D synchronization source is searched, the UE may acquire the time-frequency synchronization through the D2D synchronization signal/ sequence received from the searched D2D synchronization source. In addition, the corresponding UE may transmit the D2D synchronization signal/sequence.

Further, a channel may be required, which is used for purpose of transferring system information and synchronization-related information used for the UE-to-UE communication together with synchronization and the channel for the purpose may be defined. The channel may be referred to as a physical D2D synchronization channel (PD2DSCH) or a physical sidelink broadcast channel (PSBCH).

Hereinafter, direct communication between two devices in the D2D communication is described as an example for clarity, but the scope of the present invention is not limited thereto and the same principle described in the present invention may be applied even to D2D communication among two or more plural devices.

D2D discovery

Hereinafter, in the present description, a signal (alternatively, message) which the UEs periodically transmit for the D2D discovery may be referred to as the discovery message, the discovery signal, a beacon, and the like. Hereinafter, the discovery message, the discovery signal, the beacon, and the like are collectively called the discovery message.

In distributed discovery, as a resource used for the UE to transmit and receive the discovery message, a dedicated resource may be periodically allocated apart from a cellular resource. The dedicated resource will be described below with reference to FIG. 9.

FIG. 9 is a diagram for describing a distributed discovery resource allocating method in the wireless communication system to which the present invention can be applied.

Referring to FIG. 9, in a distributed discovery scheme, a discovery subframe (that is, a 'discovery resource pool') 901 for discovery among all cellular uplink frequency-time resources is fixedly (alternatively, dedicatedly) allocated and the residual area is constituted by an LTE uplink wide area network (WAN) subframe area 902 in the related art. The discovery resource pool may be constituted by one or more subframes.

The discovery resource pool may be periodically allocated at a predetermined time interval (that is, a 'discovery period'). Further, the discovery resource pool may be repeatedly configured within one discovery period.

FIG. 9 illustrates an example in which the discovery resource pool is allocated with a discovery period of 10 sec and 64 consecutive subframes are allocated to the respective discovery resource pools. However, the size of the time/ frequency resource of the discovery period and the discovery resource pool corresponds to one example and the present invention is not limited thereto.

The UE autonomously selects the resource (that is, the 'discovery resource') for transmitting the discovery message thereof in the dedicatedly allocated discovery pool and transmits the discovery message through the selected resource.

D2D Direct Communication

The D2D control information may be referred to as sidelink control information (SCI) or scheduling assignment (SA). As described above, the D2D control information may be transmitted on the PSCCH and the D2D data may be transmitted on the PSSCH. Hereinafter, the D2D control information will be referred to as SA.

FIG. 10 is a diagram for describing a method for transmitting/receiving signaling for D2D direct communication in the wireless communication system to which the present invention can be applied.

FIG. 10 illustrates a method that performs the D2D communication by transmitting/receiving a D2D operating procedure in a D2D operating procedure (D2D communication Mode 1) by the control of the base station and information associated therewith.

As illustrated in FIG. 10, a scheduling assignment (SA) resource pool 1010 and/or a data resource pool 1020 associated with the D2D communication may be pre-configured and the pre-configured resource pool may be transmitted from the base station to the D2D UEs through the high layer signaling.

The high layer signaling may be the RRC signaling.

An expression of 'A and/or B' used in the specification may be interpreted as a concept meaning at least one of A and B (indicating A, B, or A & B).

The SA resource pool and/or data resource pool means a resource reserved for the D2D (UE-to-UE) link or the D2D communication.

The UE-to-UE link may be expressed as sidelink.

In detail, the SA resource pool means a resource area to transmit the SA and the data resource pool means a resource area to transmit the D2D data.

The SA may be transmitted according to an SA period 1030 and the D2D data may be transmitted according to a data transmission period 1040.

The SA period and/or the data transmission period may be transmitted from the base station to the D2D UE through a D2D grant.

Alternatively, the SA period may be transmitted through the D2D grant and the data transmission period may be transmitted through the SA.

Herein, the D2D grant represents downlink control information (DCI) required for transmitting the SA and the D2D data transmitted to the D2D UE by the base station.

The D2D grant may be expressed as DCI format 5 and transmitted through the physical layer channels including the PDCCH, the EPDCCH, and the like or an MAC layer channel.

Further, the D2D grant may include information associated with SA transmission and information associated with data transmission.

The SA may include a resource allocation (RA), an MCS, a new data indicator (NDI), a redundancy version (RV), and the like as an example.

As described above, the SA resource pool for the SA transmission may be transmitted through the RRC signaling.

Further, the SA may be transmitted through the Physical Sidelink Control Channel (PSCCH) and the D2D data may be transmitted through the Physical Sidelink Shared Channel (PSSCH).

The D2D transmitting UE may receive SA information, in particular, resource allocation (RA) information (hereinafter, referred to as 'SA RA' information) in which the SA may be transmitted, from the base station through the D2D grant.

In this case, the D2D transmitting UE may transmit the SA RA information received from the base station to the D2D receiving UE as it is or generate new SA RA information by referring to the received SA RA information and thereafter, transmit the newly generated SA RA information to the D2D receiving UE.

Herein, when the D2D transmitting UE newly generates the SA RA, the D2D transmitting UE needs to perform resource allocation of the SA only within the resource pool indicated by a D2D grant RA.

That is, the D2D transmitting UE may transmit the SA by selecting only a partial resource area (SA RA) in the resource area (D2D grant RA) which eNB allows to be used.

Alternatively, contrary to this, the D2D transmitting UE may use the D2D grant RA allocated by the eNB as it is.

FIG. 11 is a diagram for describing a method for transmitting downlink control information for D2D direct communication in the wireless communication system to which the present invention can be applied.

First, the SA resource pool and/or D2D data resource pool associated with the D2D communication are/is configured by a high layer (S1110).

Thereafter, the base station transmits the SA resource pool and/or D2D data resource pool to the D2D UE through the high layer signaling (S1120).

Thereafter, the base station transmits control information associated with the SA and/or control information associated with the D2D data to the D2D transmitting UE through the D2D grant separately or together (S1130). The control information includes scheduling information of the SA and/or D2D data in the SA resource pool and/or D2D data resource pool. The control information may include the RA, the MCS, the NDI, the RV, and the like as one example.

Thereafter, the D2D transmitting UE transmits the SA and/or D2D data to the D2D receiving UE based on the information received in step S1130 (S1140).

The SA transmission and the D2D data transmission may be simultaneously performed or the D2D data may be transmitted after the SA is transmitted.

Meanwhile, although not illustrated in FIG. 11, the D2D transmitting UE requests a transmission resource (that is, a PSSCH resource) for the D2D data to the base station and the base station may schedule resources for transmitting the SA and the D2D data. To this end, the buffer status report (BSR) procedure may be performed so that the D2D transmitting UE transmits the scheduling request (SR) to the base station and thereafter, the base station determines the quantity of resources requested by the D2D transmitting UE.

Herein, Since the SR is the SR for requesting allocation of not the PUSCH resource but the PSSCH resource, the SR may be distinguished from the SR for requesting the PUSCH resource. To this end, in order to distinguish the SR for the PSSCH from the SR for the PUSCH, a PUCCH resource index (that is, the PRB in which the SR is transmitted), a cyclic shift (CS) applied to the basic sequence (e.g., ZC sequence) for frequency domain spread of the SR, and an orthogonal code (OC) for time domain spread of the SR may be differently configured.

When the D2D Rx UEs monitor the control information pool and decodes control information associated therewith, the D2D Rx UEs may selectively decode D2D data transmission associated with the corresponding control information.

The D2D grant serves to allocate the resources which the D2D Tx UE requires for transmitting the SA and the data and transfer the control information including the MCS, and the like, that is, the scheduling information, as described above.

Further, since the SCI is used for scheduling the PSSCH from the viewpoints of the D2D Tx UE and the D2D Rx UE, a DCI format for the D2D grant proposed in the present invention may be used for scheduling the PSSCH and include field information of the SCI.

The DCI format for the D2D grant (alternatively, the sidelink grant) includes both the scheduling for the SA and the data as described above, but a resource allocation assignment/allocation (RA) field (alternatively, information) for the SA and an RA field (alternatively, information) for the data may be distinguished from each other.

For example, the DCI format for the D2D grant may be constituted by a frequency hopping flag (FH) field, a resource allocation (RA) field for the D2D SA, a first RA field for the D2D data, a second RA field for the D2D data, a TPC field, and a zero padding (ZP) bit(s) (a case in which the ZP bit(s) is(are) present).

The FH field indicates whether frequency hopping is applied at the time of transmitting the SA and the data. Since the FH field may be commonly applied to the SA transmission and the data transmission, the FH field may be constituted by one field.

For example, when an FH field value is '1', the D2D Tx UE performs frequency hopping transmission at the time of transmitting the SA and the data and when the FH field value is '0', the D2D Tx UE does not perform the frequency hopping transmission at the time of transmitting the SA and the data.

The SA RA field (alternatively, a PSCCH RA field, a resource field for the PSCCH) indicates resource information for the SA transmission. That is, the SA RA field indicates scheduling information (that is, resource information) for PSCCH transmission. Therefore, the D2D Tx UE transmits the SA (that is, the PSCCH) in a resource indicated by the SA RA field.

Herein, the SA RA field may also include information (alternatively, an index) for deriving a time for the SA transmission and/or a position of the frequency resource area.

For example, the SA RA field may announce a start position (that is, the index) of the resource for the SA transmission. In other words, the SA RA field may indicate a start index of a subframe and/or a resource block in which the SA is transmitted.

Further, the D2D Tx UE may derive a time resource (e.g., a subframe index) and/or a frequency resource (e.g., a resource block index) for the SA transmission by using a predetermined function (equation) based on the information included in the SA RA field.

The resource allocation information for the D2D data transmission may be constituted by a D2D data first RA field (alternatively, a first PSCCH RA field, a resource block allocation and hopping resource allocation field), a D2D data second RA field (alternatively, a second PSSCH RA field, a time resource pattern field).

The D2D data first RA field indicates the resource information (e.g., the resource block) for the D2D data transmission in the frequency domain. That is, the D2D data first RA field indicates the scheduling information in the frequency domain for the PSSCH transmission. Therefore, the D2D Tx UE transmits the D2D data (that is, the PSSCH) in a frequency resource indicated by the D2D data first RA field.

For example, the D2D data first RA field may indicate a start position (that is, a start resource block index) of the resource block for the D2D data transmission and the length of the allocated resource block by using a resource indication value (RIV) like a UL RA scheme.

Further, the D2D data first RA field may separately and announce the start position (that is, the start resource block index) and an end position (that is, a last resource block index) of the resource block for the D2D data transmission as separate fields (alternatively, information). In this case, an additional bit (e.g., 1 bit) may be further required.

The D2D data second RA field indicates resource information (e.g., the subframe) used for the D2D data transmission in the time domain. That is, the D2D data second RA field indicates the scheduling information in the time domain for the PSSCH transmission. Therefore, the D2D Tx UE transmits the D2D data (that is, the PSSCH) in a time resource indicated by the D2D data first RA field.

For example, the D2D data second RA field may indicate a subframe pattern (that is, a time resource pattern) to be used for the D2D data transmission. That is, the D2D data second RA field may include information indicating the time resource pattern used for the PSCCH transmission.

Herein, the D2D data second RA field may indicate any one pattern of a plurality of predetermined time resource patterns. For example, n subframe patterns (expressed by a bitmap) may be pre-defined like SF pattern #0(10001010), SF pattern #1(00111001), . . . , SF pattern #n(10011001) and the D2D data second RA field may indicate any one subframe pattern of n defined subframe patterns. Herein, a value of '1' of the bitmap may mean that the D2D data is transmitted in a corresponding subframe and a value of '0' may mean that the D2D data is not transmitted in the corresponding subframe. Further, the values of the bitmap may have meanings contrary thereto.

A TPC field indicates transmission power for the SA and data transmission in the D2D Tx UE. That is, the TPC field indicates transmission power information of the PSCCH and the PSSCH.

The TPC field may be constituted by one field. As such, when the TPC field is constituted by one field, the TPC field value is commonly applied to the transmission power for the SA transmission and the transmission power for the data transmission.

The ZP may be filled with the control information, not used, or not present as necessary. That is, when the ZP is not required, the ZP may be omitted.

Each field order and a bit count of each bit of the DCI format exemplified as above are just one example for easy description and may be modified.

Meanwhile, as compared with DCI format 0 given above, the DCI format for the D2D grant exemplified as above may not include the MCS field.

When the eNB announces the MCS value to the D2D Tx UE, the MCS field needs to be present in the DCI format for the D2D grant. However, the D2D Tx UE may autonomously determine the MCS value or the MCS value may be transferred through the higher layer signaling (e.g., the RRC signaling) or determined as a pre-fixed value. Accordingly, the D2D grant does not include the MCS field.

Further, the DCI format for the D2D grant exemplified as above may not include even the NDI field and the RV field. Similarly to the above, the D2D Tx UE may autonomously determine the NDI and RV values or the NDI and RV values may be transferred through the higher layer signaling (e.g., the RRC signaling) or determined as pre-fixed values.

General Wireless Communication System to which the Present Invention May be Applied FIG. 12 illustrates one example of the IEEE 802.11 system to which the present invention may be applied.

The structure of the IEEE 802.11 system may include a plurality of components, and through interaction of the components, a wireless communication system supporting station (STA) mobility transparent to the upper layer may be provided. A BSS (Basic Service Set) may correspond to the basic building block of the IEEE 802.11 system.

FIG. 12 illustrate an example in which three BSSs (BSS 1 to BSS 3) are present, and each BSS has two STAS as its members (STA 1 and STA 2 belong to BSS 1, STA 3 and STA 4 belong to BSS 2, and STA 5 and STA 6 belong to BSS 3).

An ellipse in FIG. 12 representing a BSS may be regarded as representing a coverage region in which communication is maintained for those STAs belonging to the corresponding BSS. The coverage region may be called a BSA (Basic Service Area). If an STA moves out of the BSA, the STA may not be able to communicate directly with other STAs belonging to the corresponding BAS.

The most basic type of BSS in the IEEE 802.11 system is Independent BSS (IBSS). For example, the minimal form of an IBSS may be realized by only two STAs. Also, the BSS 3 of FIG. 12, which exhibits the simplest form and does not have other components, may correspond to a typical example of the IBSS. Such a structure may be implemented when STAs are capable of communicating directly with each other. Also, this type of LAN is not planned and configured in advance, but may be configured when a LAN is required, which may also be called an ad-hoc network.

The membership of an STA in a BSS may change dynamically due to turning on or off of the STA or the STA's entering or leaving the BSS region. To become a member of the BSS, an STA may join the BSS through a synchronization process. To access all of the services based on the BSS structure, STAs should be associated with the BSS. The association may be configured dynamically and may include use of a DSS (Distribution System Service).

The distance of a direct STA-to-STA communication in the IEEE 802.11 system may be limited by the performance of the physical layer (PHY layer). In some cases, the distance limit may be enough for communication, but depending on situations, communication with an STA at a more distant location may be needed. To support extended coverage, a DS (Distribution System) may be implemented.

A DS refers to a structure according to which BSSs are connected to each other. More specifically, as shown in FIG. 12, instead of a BSS being defined independently, a BSS may be defined as a component in an extended form of a network comprising a plurality of BSSs.

DS is a logical concept and may be specified by the characteristics of a DSM (Distribution System Medium). In this regard, the IEEE 802.11 standard distinguishes a WM (Wireless Medium) from a DSM (Distribution System Medium). Each logical medium is used for its own purpose different from the other and used by a different component. In the definition of the IEEE 802.11 standard, these media are explicitly confined neither to be the same nor to be different from each other. As pointed out, the fact that a plurality of media is logically different from one another may explain the flexible structure (DS structure or a different network structure) of the IEEE 802.11 system. In other words, the structure of the IEEE 802.11 system may be implemented in various ways, and the corresponding system structure may be specified independently according to physical characteristics of each implementation example.

A DS may support a mobile device by providing seamless integration of a plurality of BSSs and providing logical services required for handling addresses towards a destination.

An AP represents an entity enabling associated STAs to access a DS through a WM and providing an STA functionality. Data transfer may be performed between a BSS and a DS through an AP. For example, the STA 2 and STA 3 shown in FIG. 12, while providing STA functionalities, provides a function to enable associated STAs (STA 1 and STA 4) to access a DS. Also, since all the APs correspond to an STA by default, all the APs are addressable entities. The address used by an AP for communication on a WM doesn't have to be the same as the address used by the AP for communication on a DSM.

The data transmitted from one of STAs associated with an AP to the STA address of the AP may always be received at an uncontrolled port and processed by an IEEE 802.1x port access entity. Also, if a controlled port is authenticated, transfer data (or frames) may be transmitted to the DS.

A wireless network having an arbitrary size and complexity may comprise a DS and BSSs. In the IEEE 802.11 system, the aforementioned network is called an ESS (Extended Service Set) network. An ESS may correspond to a set of BSSs connected to one DS. However, an ESS does not include a DS. An ESS network is characterized as an IBSS network in an LLC (Logical Link Control) layer. STAs belonging to an ESS may communicate with each other, and mobile STAs may move from one BSS to another (within the same ESS) transparently to the LLC layer.

The IEEE 802.11 system does not impose any assumption on relative physical positions of the BSSs of FIG. 12, and all of the following forms are allowed for a BSS.

More specifically, BSSs may overlap partly with each other, which is a typical way of configuration to provide continuous coverage. Also, BSSs may not be physically connected to each other, and logically there is no limit to the distance between BSSs. Also, BSSs may be located at the same physical positions, which may be used for providing redundancy. Also, one (or more) IBSS or ESS networks may exist physically in the same space as one or more ESS network. This may correspond to an ESS network applied to a case in which an ad-hoc network is operating at a location where an ESS network is formed, a case in which physically overlapping IEEE 802.11 networks are constructed by separate organizations, or a case in which two or more different accesses and security policies are required at the same location.

In the WLAN system, an STA is a device operating according to the MAC (Medium Access Control)/PHY protocol of the IEEE 802.11 system. Unless the functions of an STA is differentiated individually from those of an AP, an STA may include an AP STA and a non-AP STA. However, if communication is performed between an STA and an AP, the STA may be regarded as a non-AP STA. In the example of FIG. 12, STA 1, STA 4, STA 5, and STA 6 correspond to non-AP STAs; and STA 2 and STA 3 correspond to AP STAs.

Non-AP STAs correspond to the devices handled directly by the users, such as laptop computers and mobile phones. In what follows, a non-AP STA may also be called a wireless device, terminal, user equipment (UE), mobile station (MS), mobile terminal, wireless terminal, WTRU (Wireless Transmit/Receive Unit), network interface device, MTC (Machine-Type Communication) device, and M2M (Machine-to-Machine) device.

Also, an AP is a conceptual entity corresponding to a base station (BS), Node-B, evolved Node-B (eNB), BTS (Base Transceiver System), and femto BS in other wireless communication fields.

In what follows, downlink (DL) represents communication from an AP to a non-AP STA, and uplink (UL) represents communication from a non-AP STA to an AP. In downlink transmission, a transmitter is part of an AP, and a receiver is part of a non-AP STA. In uplink transmission, a transmitter represents part of a non-AP STA, and a receiver represents part of an AP.

FIG. 13 illustrates a structure of layer architecture of the IEEE 802.11 system to which the present invention may be applied.

Referring to FIG. 13, the layer architecture of the IEEE 802.11 system may include MAC (Medium Access Control) sublayer/layer and PHY (Physical) sublayer/layer.

The PHY layer may be distinguished by a PLCP (Physical Layer Convergence Procedure) entity and a PMD (Physical Medium Dependent) entity. In this case, a PLCP entity perform the role of connecting the MAC layer to a data frame, and a PMD entity performs the role of transmitting and receiving two or more STAs and data wirelessly.

Both of the MAC and PHY layer may include a management entity, which may be called a MAC Sublayer Management Entity (MLME) and a Physical Sublayer Management Entity (PLME), respectively. These management entities provide a layer management service interface through the operation of a layer management function. An MLME, being connected to a PLME, may perform a management operation of the MAC layer. In the same way, the PLME, being connected to the MLME, may perform a management operation of the PHY layer.

To make sure a correct MAC operation, an SME (Station Management Entity) may be employed within each STA. An SME is a management entity independent of each layer, which collects layer-based status information from an MLME and a PLME or configures specific parameters of each layer. An SME may perform the aforementioned function on behalf of general system management entities and may implement a standard management protocol.

The MLME, PLME, and SME may interact with each other by using various methods based on primitives. More specifically, an XX-GET.request primitive is used to request a value of MIB (Management Information Base) attribute, and an XX-GET.confirm attribute returns the corresponding MIB attribute value if the status is 'SUCCESS' but returns a status field with an error mark, otherwise. An XX-SET-.request primitive is used to request a specified MIB attribute to be set to a given value. If an MIB attribute indicates a specific operation, this request requests execution of the specific operation. And if an XX-SET.confirm primitive returns a status of 'SUCCESS', it indicates that the specified MIB attribute has been set to a requested value. For other cases, the status field represents an error status. If the MIB attribute indicates a specific operation, the primitive may confirm that the corresponding operation has been performed.

The PHY layer provides an interface through TXVECTOR, RXVECTOR, and PHYCONFIG_VECTOR. The TXVECTOR supports the PHY layer with transfer parameters for each PPDU. By using the RXVECTOR, the PHY layer informs the MAC layer of received PPDU parameters. The TXVECTOR is transferred from the MAC layer to the PHY layer through a PHY-TXSTART.request primitive, and the RXVECTOR is transferred from the PHY layer to the MAC layer through a PHY-RXSTART.indication primitive.

The MAC layer configures the operation of the PHY layer independently of frame transmission or reception by using the PHYCONFIG_VECTOR.

Operations in each sublayer (or layer) may be described briefly as follows.

The MAC layer generates one or more MAC protocol data unit (MPDU) by attaching a MAC header and a frame check sequence (FCS) to the MAC service data unit (MSDU) or fragment of the MSDU received from an upper layer (for example, LLC). The generated MPDU is delivered to the PHY layer.

When the A-MSDU (aggregated MSDU) scheme is used, a plurality of MSDUs may be aggregated into a single A-MSDU. The MSDU aggregation operation may be performed in the MAC upper layer. The A-MSDU is delivered to the PHY layer as a single MPDU (if not fragmented).

The PHY layer generates a Physical Protocol Data Unit (PPDU) by attaching an additional field including information required by a physical layer transceiver to a PSDU (Physical Service Data Unit) received from the MAC layer. The generated PPDU is transferred through a wireless medium.

Since a PSDU is received by the PHY layer from the MAC layer, and an MPDU is transmitted from the MAC layer to the PHY layer, a PSDU is actually the same as the MPDU.

If the A-MPDU (aggregated MPDU) scheme is used, a plurality of MPDUs (at this time, each MPDU may carry an A-MSDU) may be aggregated into a single A-MPDU. The MPDU aggregation operation may be performed in the MAC lower layer. Various types of MPDUs (for example, QoS data, ACK (Acknowledge), and block ACK) may be aggregated into an A-MPDU. The PHY layer receives the A-MPDU as a single PSDU from the MAC layer. In other words, a PSDU comprises a plurality of MPDUs. Therefore, an A-MPDU is transferred from within a single PPDU through a wireless medium.

A PPDU (Physical Protocol Data Unit) refers to a data block generated in the physical layer. In what follows, the PPDU format is described with respect to the IEEE 802.11 WLAN system to which the present invention may be applied.

FIG. 14 illustrates a non-HT format PPDU and HT format PPDU of a wireless communication system to which the present invention may be applied.

FIG. 14(a) illustrates a non-HT format PPDU for supporting the IEEE 802.11a/g system. A non-HT PPDU may be called a legacy PPDU.

Referring to FIG. 14(a), a non-HT format PPDU comprises a legacy format preamble comprising an L-STF (Legacy (or non-HT) Short Training Field), L-LTF (Legacy (or non-HT) Long Training Field), and L-SIG (Legacy (or non-HT) Signal) field; and a data field.

The L-STF may include a short training OFDM (Orthogonal Frequency Division Multiplexing) symbol. The L-STF may be used for frame timing acquisition, AGC (Automatic Gain Control), diversity detection, and coarse frequency/time synchronization.

The L-LTF may include a long training OFDM symbol. The L-LTF may be used for fine frequency/time synchronization and channel estimation.

The L-SIG field may be used for transmitting control information for demodulation and decoding of the data field. The L-SIG field may include information about a data rate and data length.

FIG. 14(b) illustrates an HT-mixed format PPDU for supporting both of the IEEE 802.11n system and the IEEE 802.11a/g system.

Referring to FIG. 14(b), the HT-mixed format PPDU comprises a legacy format preamble comprising the L-STF, L-LTF, and L-SIG field; an HT format preamble comprising an HT-SIG field, HT-STF (Short Training Field), and HT-LTF (Long Training Field); and a data field.

Since the L-STF, L-LTF, and L-SIG field are legacy fields intended for backward compatibility, they are the same as the non-HT format. Even if the HT-mixed PPDU is received, an L-STA may interpret the data field through the L-LTF, L-LTF, and L-SIG field. However, the L-LTF may further include information for channel estimation to be performed by an HT-STA to receive the HT-mixed PPDU and demodulate the L-SIG and HT-SIG fields.

An HT-STA may recognize the HT-mixed format PPDU by using the HT-SIG field following the legacy field, based on which the data field may be decoded.

The HT-LTF field may be used for channel estimation for demodulation of the data field. Since the IEEE 802.11n supports SU-MIMO (Single-User Multi-Input and Multi-Output), multiple HT-LTF fields may be formed to perform channel estimation with respect to each of the data fields transmitted as a plurality of spatial streams.

The HT-LTF field may comprise a data HT-LTF used for channel estimation of spatial streams and an extension HT-LTF used additionally for full channel sounding. Therefore, the number of HT-LTFs may be equal to or larger than the number of spatial streams transmitted.

The HT-mixed format PPDU transmits the L-STF, L-LTF, and L-SIG field first so that an L-STA may also receive the data. Afterwards, the HT-SIG field is transmitted for demodulation and decoding of data transmitted to an HT-STA.

Up to the HT-SIG field, transmission is performed without performing beamforming so that an L-STA and HT-STA may receive the corresponding PPDU and obtain data. Radio signal transmission through precoding is performed on the HT-STF, HT-LTF, and data field subsequent to the HT-SIG field. Here, the HT-STF field is transmitted first and a plurality of HT-LTFs and data field are transmitted so that an STA receiving data through precoding may take into account the varying power due to the precoding.

FIG. 14(c) illustrates the HT-GF (greenfield) format PPDU for supporting the IEEE 802.11n system only.

Referring to FIG. 14(c), the HT-GF format PPDU includes an HT-GF-STF, HT-LTF1, HT-SIG field, a plurality of HT-LTF2, and data field.

The HT-GF-STF is used for frame timing acquisition and AGC.

The HT-LTF1 is used for channel estimation.

The HT-SIG field is used for demodulation and decoding of the data field.

The HT-LTF2 is used for channel estimation for demodulation of the data field. In the same way, since the HT-STA operates according to the SU-MIMO scheme, channel estimation is required for each data field transmitted via a plurality of spatial streams, which requires a plurality of HT-LTF2s.

A plurality of HT-LTF2s may comprise a plurality of data HT-LTFs and a plurality of extension HT-LTFs like the HT-LTF field of the HT-mixed PPDU.

The data field appearing in FIG. 14(a) to (c) may comprise, as a payload, a service field, scrambled PSDU field, tail bits, and padding bits. All the bits in the data field are scrambled.

FIG. 14(d) represents a service field included in the data field. The service field comprises 16 bits. Each bit is numbered from 0 to 15 and is transmitted sequentially from the 0-th bit. The 0-th to the sixth bits are set to 0 and are used for synchronizing a descrambler within a receiver.

The IEEE 802.11ac WLAN system supports transmission based on downlink MU-MIMO (Multi-User Multiple Input Multiple Output) scheme in which a plurality of STAs access a channel simultaneously to utilize a radio channel efficiently. According to the MU-MIMO transmission scheme, an AP may transmit a packet simultaneously to one or more MIMO-paired STAs.

DL MU (downlink multi-user) transmission refers to the technology that an AP transmits a PPDU to a plurality of non-AP STAs by using the same time resources through one or more antennas.

In what follows, an MU PPDU refers to a PPDU that transmits one or more PSDUs for one or more STAs by using the MU-MIMO or OFDMA technology. And an SU PPDU refers to a PPDU that is capable of transmitting only one PSDU or a PPDU having a format that does not have a PSDU.

For MU-MIMO transmission, size of control information transmitted to an STA may be relatively larger than the size of the 802.11n control information. Examples of control information required additionally to support the MU-MIMO transmission may include information indicating the number of spatial streams received by each STA and information related to modulation and coding of the data transmitted to each STA.

Therefore, when MU-MIMO transmission is performed to provide a data service to a plurality of STAs simultaneously, the size of control information transmitted may increase in proportion to the number of receiving STAs.

To efficiently transmit the control information, the size of which increasing as described above, a plurality of control information required for MU-MIMO transmission may be transmitted by being divided into two types of information comprising common control information required commonly for all the STAs and dedicated control information required individually for a specific STA.

FIG. 15 illustrates a VHT format PPDU of a wireless communication system to which the present invention may be applied.

FIG. 15 illustrates a VHT format PPDU for supporting the IEEE 802.11ac system.

Referring to FIG. 15, the VHT format comprises a legacy format preamble comprising the L-STF, L-LTF, and L-SIG field; a VHT format preamble comprising a VHT-STF (VHT Short Training Field), VHT-LTF (VHT Long Training Field), and VHT-SIG-B (VHT-Signal-B) field; and a data field.

Since the L-STF, L-LTF, and L-SIG field are legacy fields intended for backward compatibility, they are the same as the non-HT format. However, the L-LTF may further include information for channel estimation performed to demodulate the L-SIG and VHT-SIG-A fields.

The L-STF, L-LTF, L-SIG field, and VHT-SIG-A field may be transmitted being repeated in units of 20 MHz channels. For example, when the PPDU is transmitted through four 20 MHz channels (namely through bandwidth of 80 MHz), the L-STF, L-LTF, L-SIG field and VHT-SIG-A field may be transmitted being repeated every 20 MHz channel.

The VHT-STA may recognize the VHT format PPDU by using the VHT-SIG-A field subsequent to the legacy fields, based on which the data field may be decoded.

The VHT format PPDU transmits the L-STF, L-LTF, and L-SIG field first so that an L-STA may also receive the data. Afterwards, the VHT-SIG-A field is transmitted for demodulation and decoding of data transmitted to a VHT-STA.

The VHT-SIG-A field is a field for transmitting control information common to VHT STAs MIMO-paired with an AP, which include control information for interpreting a received VHT format PPDU.

The VHT-SIG-A field may contain a VHT-SIG-A1 field and a VHT-SIG-A2 field.

The VHT-SIG-A1 field may include channel bandwidth (BW) information, information about whether STBC (Space Time Block Coding) is applied, group identifier (ID) information for indicating a group of STAs in the MU-MIMO scheme, information about the number of space-time stream (NSTS) used/partial AID (association Identifier), and transmit power save forbidden information. Here, a group ID represents an identifier assigned to a group of target STAs to support MU-MIMO transmission and indicate whether a currently used MIMO transmission method is based on the MU-MIMO or SU-MIMO scheme.

The VHT-SIG-A2 field may include information whether a short GI (Guard Interval) is used, FEC (Forward Error Correction) information, information about an MCS (Modulation and Coding Scheme) for a single user, information about the type of channel coding for multiple users, beamforming-related information, redundancy bits for CRC (Cyclic Redundancy Checking), and tail bits of convolutional decoding.

The VHT-STF field is used for improving performance of AGC estimation in MIMO transmission. The duration of the VHT-STF field is 4 µs.

The VHT-LTF field is used for a VHT-STA to estimate a MIMO channel. Since a VHT WLAN system supports MU-MIMO scheme, as many VHT-LTF fields as the number of spatial streams to which a PPDU is transmitted may be configured. In addition, if full channel sounding is supported, the number of VHT-LTF fields may be larger.

The VHT-SIG-B field includes common control information required for a plurality of MU-MIMO paired VHT-STAs to receive a PPDU and obtain data. Therefore, a VHT-STA may be designed to decode the VHT-SIG-B field only when the common control information included in the VHT-SIG-A field indicates MU-MIMO transmission by a currently received PPDU. On the other hand, when common control information indicates that a currently received PPDU is intended for a single VHT-STA (including SU-MIMO scheme), an STA may be designed not to decode the VHT-SIG-B field.

The VHT-SIG-B field includes information about modulation, encoding, and rate-matching of each VHT-STA. The size of the VHT-SIG-B field may be varied according to the type of MIMO transmission (MU-MIMO or SU-MIMO) and channel bandwidth used for PPDU transmission.

Information indicating the bit size of the data field constituting a PPDU and/or information indicating the size of a bit stream constituting a specific field may be included in the VHT-SIG-A field to transit the PPDU of the same size to STAs paired with an AP in a system supporting the MU-MIMO scheme.

However, to use the PPDU format efficiently, the L-SIG field may be used. In order for PPDUs of the same size to be transmitted to all of the STAs, the length field and rate field transmitted by being included in the L-SIG field may be used to provide necessary information. In this case, since an MPDU (MAC Protocol Data Unit) and/or A-MPDU (Aggregate MAC Protocol Data Unit) is configured on the basis of byte units (or octet) for the MAC layer, additional padding may be required in the physical layer.

The data field of FIG. 15 is a payload and may include a service field, scrambled PSDU, tail bits, and padding bits.

Since communication in the IEEE 802.11 system is performed in a shared wireless medium, it exhibits inherently different characteristics from the communication in a wired channel environment.

In a wired channel environment, communication based on CSMA/CD (Carrier Sense Multiple Access/Collision Detection) is possible. For example, once a signal is transmitted from a transmitter, the signal is transmitted without a significant signal attenuation until it reaches a receiver since there is no considerable change in the channel environment. At this time, detection of collision among two or more signals is possible. This is so because the power received at the receiver rises instantaneously above the power transmitted at the transmitter. However, since various factors influence the channel in a wireless channel environment (for example, a signal may attenuate according to distance or suffer deep fading instantaneously), it is not possible for a transmitter to perform carrier sensing correctly about whether a signal has reached the receiver properly or collision has occurred.

Therefore, the WLAN system compliant with the IEEE 802.11 standard has adopted a CSMA/CA (Carrier Sense Multiple Access with Collision Avoidance) mechanism as a basic access mechanism for the MAC layer. The CSMA/CA mechanism is also called a DCF (Distributed Coordination Function) of the IEEE 802.11 MAC protocol, which employs a "listen before talk" access mechanism by default. According to the access mechanism of this type, an AP and/or STA performs CCA (Clear Channel Assessment) for sensing a radio channel or medium for a predetermined time period (for example, DIFS (DCF Inter-Frame Space)) before starting transmission. If it is found from the sensing result that the medium is in the idle status, frame transmission is started through the corresponding medium. On the other hand, if the medium is found to be in an occupied status, the corresponding AP and/or STA does not start its transmission immediately but may attempt frame transmission after waiting a delay time for medium access (for example, a random backoff period) in addition to the DIFS on the assumption that many STAs are already waiting to use the corresponding medium.

Suppose there are many STAs attempting to transmit frames. By applying a random backoff period, then the STAs may be expected to have probabilistically different backoff periods from each other and attempt frame transmission after waiting the respective time periods different from each other, by which collision may be minimized.

Also, the IEEE 802.11 MAC protocol provides an HCF (Hybrid Coordination Function). The HCF is based on the DCF and PCF (Point Coordinate Function). A PCF refers to a periodic polling method that enables all of the receiving APs and/or STAs to receive data frames according to a polling-based synchronous access scheme. Also, the HCF provides EDCA (Enhanced Distributed Channel Access) and HCCA (HCF Controlled Channel Access). The EDCA refers to performing a contention-based access method for a service provider to provide data frames to a plurality of users while the HCCA refers to performing a non-contention based channel access method using a polling mechanism. Also, the HCF includes a medium access mechanism for improving QoS (Quality of Service) of the WLAN system and may transmit QoS data according to both of the CP (Contention Period) and CFP (Contention Free Period).

FIG. 16 illustrates a random backoff period and a frame transfer procedure in a wireless communication system to which the present invention may be applied.

If a specific medium is changed from the occupy or busy status to the idle status, many STAs may attempt data (or frame) transmission. At this time, to minimize collision, each STA may select a random backoff count and attempt transmission after waiting a slot time corresponding to the random backoff count. The random backoff count has a pseudo-random integer value and may be determined by one of the values ranging from 0 to a uniformly distributed value within the range of a contention window. At this time, the CW is a parameter value of a contention window. The CW parameter assumes CW_min as its initial value, but when transmission fails (for example, when ACK is not received with respect to a transmitted frame), it may take double the value of the initial one. If the CW parameter becomes CW_max, data transmission may be attempted until the data transmission is successful by keeping the CW parameter to CW_max. When data transmission is successfully performed, the CW parameter is reset to the CW_min. It is preferable that CW, CW_min, and CW_max value are set to $(2^n)-1$, where n=0, 1, 2, . . . .

If a random backoff process is started, an STA counts down the backoff slot according to a backoff count value determined and continuously monitors the medium during countdown. If the medium is found to be an occupy status, the STA stops the countdown and waits. If the medium enters the idle status, the STA resumes the countdown.

In the example of FIG. 9, when packets to be transmitted arrive at the MAC layer of STA 3, the STA 3 may confirm that the medium is in the idle status during the DIFS and transmit frames immediately.

Meanwhile, the remaining STAs monitor to find that the medium is in the busy status and wait. While waiting, each of the STA 1, STA 2, and STA 5 may have data to transmit. Finding that the medium is in the idle status from monitoring thereof, each STA waits as long as the DIFS and counts down the backoff slot according to the random backoff count value selected by each individual STA.

In the example of FIG. 16, the STA 2 selects the smallest backoff count value, and the STA 1 selects the largest backoff count value. In other words, the example illustrates a case in which, at the time the STA 2 finishes the backoff count and starts frame transmission, the remaining backoff time of the STA 5 is shorter than that of the STA 1.

The STA 1 and STA 5 stops countdown and waits while the STA 2 occupies the medium. When the medium occupied by the STA 2 is released and enters again the idle status, the STA 1 and STA 5 wait for a time period of DIFS and resume the backoff count. In other words, frame transmission may be started after countdown of the remaining backoff slot lasting as long as the remaining backoff time. Since the remaining backoff time of the STA 5 is shorter than that of the STA 1, frame transmission of the STA 5 is started.

Meanwhile, while the STA 2 occupies the medium, the STA 4 may also generate data to transmit. At this time, when the medium enters the idle state, the STA 4 waits for a time period of DIFS and performs countdown of the backoff slot according to a random backoff count value that the STA 4 has selected.

In the example of FIG. 16, the remaining backoff time of the STA 5 happens to be the same as the random backoff count value of the STA 4. In this case, collision may occur between the STA 4 and the STA 5. In the occurrence of collision, both of the STA 4 and STA 5 do not receive the ACK and fail to perform data transmission. In this case, the STA 4 and STA 5 doubles the CW value, selects a random backoff count value, and performs countdown of the backoff slot.

Meanwhile, the STA 1 waits for a time period in which the medium is in the occupy status due to transmission of the STA 4 and STA 5, further waits as long as the DIFS when the medium becomes in the idle status, and starts frame transmission after the remaining backoff time is passed.

The CSMA/CA mechanism includes virtual carrier sensing in addition to physical carrier sensing by which an AP and/or STA senses the medium directly.

Virtual carrier sensing is intended to compensate the problem that may occur during medium access, such as the hidden node problem. To implement virtual carrier sensing, the MAC layer of the WLAN system uses a network allocation vector (NAV). The NAV is a value specified by an AP and/or STA which is currently using the medium or has a right to use the medium about the remaining time until the medium returns to the available status for other APs and/or STAs. Therefore, the value set as the NAV corresponds to the period for which the medium is supposed to be used by an AP and/or STA transmitting the corresponding frame, and an STA receiving the NAV value is prohibited from performing medium access during the corresponding period. The NAV, for example, may be configured according to the value of the duration field of the MAC header of a frame.

An AP and/or STA may perform a procedure of exchanging an RTS (Request to Send) frame and a CTS (Clear to Send) frame to inform of accessing the medium. The RTS and CTS frame include information indicating a time interval reserved for access to a radio medium required for an ACK frame to be transmitted and received when actual data frame transmission and a reception confirm response (ACK) are supported. Other STAs which receive an RTS frame transmitted from an AP and/or STA attempting to transmit a frame or which have received a CTS frame transmitted from a target STA for frame transmission may be configured to be disabled to access the medium during a time period specified by the information included in the RTS/CTS frame. This may be implemented by configuring the NAV during the time interval.

With an increasing interest of vendors from various fields in the next generation WiFi and the demand for high throughput and QoE (Quality of Experience) performance enhancement after the 802.11ac, a new frame format for the 802.11ax system, which is the next-generation WLAN system, and numerology are under active discussion.

The IEEE 802.11ax is the next-generation WLAN system for supporting higher data rate and processing higher user load, which is one of the WLAN systems newly proposed these days and is also called HEW (High Efficiency WLAN).

The IEEE 802.11ax WLAN system may operate in the 2.4 GHz frequency band and 5 GHz frequency band in the same way as the conventional WLAN system. Also, it may operate in the 60 GHz frequency band much higher than the aforementioned bands.

The IEEE 802.11ax system may use an FFT size four times larger than that of the existing IEEE 802.11 OFDM system (IEEE 802.11a, 802.11n, 802.11ac, and so on) in each frequency band to support average throughput enhancement and outdoor robust transmission against inter-symbol interference in an outdoor environment. This will be described with reference to a related drawing below.

In what follows, without particular notice, it is assumed that the description about the HE format PPDU may be combined with the descriptions about the non-HT format PPDU, HT-mixed format PPDU, HT-greenfield format PPDU and/or VHT format PPDU.

FIG. 17 illustrates an HE (High Efficiency) format PPDU according to one embodiment of the present invention.

Referring to FIG. 17 the HE format PPDU for HEW comprises largely a legacy part (L-part) and an HE-part.

The L-part comprises the L-STF field, L-LTF field, and L-SIG field in the same way as maintained in the conventional WLAN system. The L-STF field, L-LTF field, and L-SIG field may be called a legacy preamble.

The HE-part is the one newly defined for the 802.11ax standard, which may comprise the HE-SIG field, HE-preamble, and HE-data field. And the HE-preamble may comprise the HE-STF field and HE-LTF field. Also, the HE-STF field and HE-SIG field, as well as the HE-LTF field may be called collectively an HE-preamble.

FIG. 17 illustrates the order of the HE-SIG field, HE-STF field, and HE-LTF field, but the order may be configured differently from the one shown in the figure.

The L-part, HE-SIG field, and HE-preamble may be called collectively a physical (PHY) preamble.

The HE-SIG field may include information for decoding the HE-data field (for example, OFDMA, UL MU MIMO, and enhanced MCS).

The L-part and the HE-part (in particular, the HE-preamble and HE-data) may have different FFT (Fast Fourier Transform) sizes and may use different CPs (Cyclic Prefixes). In other words, subcarrier frequency spacing of the L-part and the HE-part (in particular, the HE-preamble and HE-data) may be defined differently from each other.

The 802.11ax system may use the FFT size four times larger (4×) than that of the legacy WLAN system. In other words, the L-part may be built on 1× symbol structure, and the HE-part (in particular, HE-preamble and HE-data) may be built on 4× symbol structure. Here, 1×, 2×, and 4× size FFT indicate relative sizes with respect to the legacy WLAN system (for example, IEEE 802.11a, 802.11n, and 802.11ac).

For example, if the FFT size used for the L-part is 64, 128, 256, and 512 at 20 MHz, 40 MHz, 80 MHz, and 160 MHz, respectively, the FFT size used for the HE-part may be 256, 512, 1024, and 2048 at 20 MHz, 40 MHz, 80 MHz, and 160 MHz, respectively.

In this way, if the FFT size becomes larger than that of the legacy WLAN system, subcarrier frequency spacing is reduced. Therefore, the number of subcarrier for unit frequency is increased, but OFDM symbol length is increased.

In other words, using larger FFT size means that subcarrier spacing becomes narrow, and similarly, the IDFT (Inverse Discrete Fourier Transform)/DFT (Discrete Fourier Transform) period becomes longer. Here, the IDFT/DFT period may indicate the symbol length excluding the GI (Guard Interval) in the OFDM symbol.

Therefore, if the HE-part (in particular, HE-preamble and HE-data) employs the FFT size four times larger than that of the L-part, the subcarrier spacing of the HE-part becomes ¼ of the subcarrier spacing of the L-part, and the IDFT/DFT period of the HE-part becomes four times the IDFT/DFT period of the L-part. For example, if the subcarrier spacing of the L-part is 312.5 kHz (=20 MHz/64, 40 MHz/128, 80 MHz/256 and/or 160 MHz/512), the subcarrier spacing of the HE-part may be 78.125 kHz (=20 MHz/256, 40 MHz/512, 80 MHz/1024 and/or 160 MHz/2048). Also, if the IDFT/DFT period of the L-part is 3.2 μs=(=1/312.5 kHz), the IDFT/DFT period of the HE-part may be 12.8 μs(=1/78.125 kHz).

Here, since the GI may use one from among 0.8 μs, 1.6 μs, and 3.2 μs, the OFDM symbol length (or symbol interval) of the HE-part including the GI may be 13.6 μs, 14.4 μs, and 16 μs according to the GI.

FIG. 17 illustrates a case in which the HE-SIG field is built on 1× symbol structure, but the HE-SIG field may also be built on 4× symbol structure like the HE-preamble and the HE-data.

Different from the example of FIG. 17, the HE-SIG may be subdivided into the HE-SIG A field and the HE-SIG B field. In this case, the FFT size per unit frequency may be further increased after the HE-SIG B. In other words, the OFDM symbol length may become longer than that of the L-part after the HE-SIG B.

The HE format PPDU for the WLAN system to which the present invention may be applied may be transmitted through at least one 20 MHz channel. For example, the HE format PPDU may be transmitted through a total of four 20 MHz channels from within 40 MHz, 80 MHz, and 160 MHz frequency bands.

Reliable Flooding Protocol Based on Subcarrier-Level Tone Signal in a Wireless Multi-Hop Network The present invention proposes a reliable network flooding protocol disseminating data (or packets) efficiently through an OFDM-based wireless multi-hop network, namely a data transfer method (in what follows, it is called 'STR-FLOOD').

By using a collision-resilient tone (or subcarrier) signal and a receiver-trigger forwarding method, the STR-FLOOD according to the present invention may achieve a high deliver ratio and low communication overhead without using any topological information. Also, the STR-FLOOD according to the present invention provides a scalable flooding solution that may change the network size. Also, the STR-FLOOD according to the present invention enables initial-hop delivery for reliable flooding and successful relay.

Network flooding is a communication service intended to disseminate data (or packets) from a source node to all the nodes within a network.

Network flooding has been employed as the most important element in a wireless multi-hop network. For example, an on-demand routing protocol such as AOVD (Ad-hoc on-demand distance vector) uses flooding to find a route from a source node to a destination node. Network flooding is also used for VANETs (Vehicular Ad-hoc Networks) for dissemination of urgent messages and WSNs (Wireless Sensor Networks) for code update, network time synchronization, and network-wide information propagation.

Packet flooding often involves a lot of simultaneous transmissions colliding with each other. The collision among packets causes unnecessary retransmission or causes a failure of forwarding packets, eventually making propagation of packets incomplete; therefore, collision should be minimized. The aforementioned problem is well known as a broadcast storm problem. In designing a flooding scheme based on a scalable network size, it is necessary to achieve both of reliability and efficiency.

Many protocols have been proposed to implement reliable and efficient network flooding.

To ensure reliability, many protocols utilize a feedback message from the MAC (Medium Access Control) layer or network layer to determine whether to deliver received packets. However, since communication overhead for exchange of feedback messages increases according to connectivity degree of nodes, the aforementioned method is not scalable in terms of node density. Also, a node has a lot of neighbor nodes in a weak link condition, responding to per-neighbor feedback may cause serious retransmission overhead. In this case, it may be more efficient to find a different packet forwarder.

With respect to efficiency, previous works may be divided into two categories: a counter-based scheme and a probability-based scheme. According to the counter-based scheme, when a node has a packet to deliver, the corresponding node schedules transmission after a random time period (namely, backoff), overhears transmission of neighbor nodes during the backoff time, and counts the number of packet transmissions. If the number of overheard transmission exceeds a threshold, the node cancels its transmission to remove unnecessary transmission of packets. However, since overhearing a plurality of packet transmissions does not indicate that all of the neighbor nodes of an overhearing node have successfully received packets, incomplete flooding may be caused.

According to the probability-based scheme, when a node has a packet to deliver, the corresponding node determines delivery of the packet with a probability p. The value of p may be the same for all of the nodes or configured differently according to the topological information such as the number of neighbor nodes. However, since an essential forwarder may not deliver a received packet with a probability of 1-p for the purpose of reliable flooding, this scheme does not guarantee complete delivery.

The present invention proposes a scalable network flooding protocol that achieves high reliability and efficiency without requiring any topological information in the OFDM-based wireless multi-hop network.

In what follows, data (or packet) may correspond to the data transmitted being mapped to the PSSCH (for example, a transport block) when the present invention is implemented in the 3GPP LTE/LTE-A system; similarly, the data may be composed according to the aforementioned PPDU format when the present invention is implemented in the WLAN system. In what follows, for the convenience of descriptions, the data will be called collectively packets.

Also, for the convenience of descriptions, a node according to the present invention represents the terminal, UE, non-AP STA, and so on described above.

Also, for the convenience of descriptions, it is assumed that the number of data (packets) flooding simultaneously is smaller than half of the total number of subcarriers. BY using the modulation operation described later, a packet sequence number may be mapped to a subcarrier number.

According to the STR-FLOOD, a node receiving a flooding packet (a packet having a sequence number i) transmits a tone signal on the subcarrier I (or subcarrier group j) to advertise its packet possession. In what follows, such a signal is called an RTF (Ready-To-Forward) signal (namely RTF(i)). The RTF signal may be transmitted through the PSBCH, PSDCH, or PSCCH when the present invention is implemented in the 3GPP LTE/LTE-A system. Also, the RTF signal may be transmitted from one symbol in the time domain.

If a node which has detected the RTF(i) still hasn't received packet i yet, the node responses a tone signal on the subcarrier (N_s)/2+i. In what follow, such a signal is called an FR (Forward-Request) signal (namely FR(i)). When the present invention is implemented in the 3GPP LTE/LTE-A system, the FT signal may be transmitted through the PSBCH, PSDCH, or PSCCH. Also, the FR signal may be transmitted from one symbol in the time domain.

Here, N_s represents the number of data subcarriers. Here, data subcarrier may correspond to the entire subcarriers in the system bandwidth and may also correspond to the subcarrier excluding a DC (Direct Current) subcarrier and a guard subcarrier from the entire subcarriers in the system bandwidth.

If a node having a packet i detects FR(i), the corresponding node delivers the packet after a predetermined delay time period (namely, a random backoff time).

At this time, as the node receives another RTF(i) from a different node within the predetermined delay time period, scheduled packet transmission may be cancelled. Also, as the node receives another FR(i) from a different node, the cancelled packet transmission may be re-scheduled. The mechanism for transmission scheduling and cancellation may prevent unnecessary transmission while a high packet delivery ratio is being achieved.

In other words, the STR-FLOOD according to the present invention may use a subcarrier level tone signal for designing RTF and FR. In fact, even if a plurality of nodes transmits tone signals together from subcarriers, each node may determine to which subcarrier a tone signal belongs by measuring the energy level of the tone signal.

The detection performance and robustness for each subcarrier with respect to signal overlapping minimizes communication overhead for exchange of RTF and FR signals and provides a scalable operation in a dense network.

System Model

In what follows, a wireless multi-hop network comprising a set V of wireless nodes is considered. Each node is configured with a half-duplex OFDM transceiver. The channel bandwidth is denoted by W, and FFT (Fast Fourier Transform) window size (namely the number of subcarriers) is denoted by N_FFT. It is assumed that among N_FFT subcarriers, N_s (<N_FFT) subcarriers are used for transmission of data symbols or tone signals. Also, it is assumed that all the nodes perform transmission with the same power and data rate.

Each node detects transmission of a packet or a tone signal by measuring energy on the channel. In particular, transmission of a packet or tone signal may be detected by detecting level energy of a subcarrier. A node v (∈V) transmits a tone signal on the subcarrier i; nodes located within the transmission range of the node v detect signal transmission and identify subcarrier i. The subcarrier level signal transmission and detection is a well-known technology.

For an interference model, a graded SINR (Signal to Interference-plus-Noise Ratio) model, which reflects an actual radio link, may be employed.

In the network flooding, the same packet may be transmitted by a plurality of nodes, and each node may transmit the same packet by using broadcasting. Therefore, if the same packet is transmitted simultaneously, a receiver may not be sure which transmission carries a desired signal.

In the present invention, it is assumed that transmission exhibiting the strongest power carries a signal desired by the receiver while the other transmissions are all regarded as interference.

It is assumed that a node w (∈V) transmits a packet to the node v (E V). In this case, SINR at the node v may be expressed by Eq. 1 below.

$$SINR_v = \frac{P_{wv}}{N + \sum_{j \in V \setminus w} P_{jv}}. \quad [\text{Eq. 1}]$$

In Eq. 1, P_wv represents received power with respect to transmission of a node w. N represents thermal noise floor, and P_jv represents interference received from a node v due to transmission of a node j.

According to the graded SINR mode, when packet reception ratio (PRR) is close to 1 if SINR is larger than the threshold β and decreases gradually to 0 as SINR becomes small. The value of β depends on transmission rate, power, packet length, and interference from another transmission.

In what follows, for the convenience of description, it is assumed that the MAC layer of each node employs the CSMA/CA (Carrier Sense Multiple Access with Collision Avoidance) mechanism described above.

According to the mechanism, a node senses a radio channel before transmitting a packet. And if the node detects that the radio channel is in the idle status, the node immediately transmits packets; otherwise, the node attempts packet transmission again after a predetermined random backoff time.

In what follows, described will be an efficient network flooding protocol according to the present invention which delivers packets from a source node to the entire nodes within a network without involving any topological information.

Two types of control signals may be used for determining delivery and cancellation of packets.

A. Control Signal

First, an RTF (Ready-To-Forward) signal is used for advertising to neighbor nodes that a node holds a flooding packet. Second, an FR (Forward-Request) signal is used for a node to request a neighbor node to deliver a flooding packet. In what follows, RTF(i) and RF(i) refer to the RTF signal and the FR signal with respect to packet i, respectively.

As described above, an RTF signal and an FR signal may be transmitted through the PSBCH, PSDCH, or PSCCH when the present invention is implemented in the 3GPP LTE/LTE-A system. Also, the RTF signal and the FR signal may be transmitted from one symbol in the time domain.

Also, the RTF signal and FR signal with respect to the packet i may be transmitted being mapped to a specific subcarrier (or specific subcarrier group). In what follows, for the purpose of convenience, descriptions are based on one subcarrier, but one subcarrier may be interpreted as being substituted for one subcarrier group.

The RTF(i) and FR(i) control signal is more resilient against an error or collision than transmission of a data packet. The RTF(i) and FR(i) are a subcarrier tone signal and may be detected by the subcarrier level energy detection technology in the OFDM network. Since energy detection does not require decoding, even if a plurality of tone signals are transmitted simultaneously in an asynchronous manner, a receiver may detect a signal with a high probability.

B. Design of RTF and FR Signal

N_s data subcarriers may be divided into two groups: N_RTF subcarriers for RTF transmission and N_FR subcarriers for FR transmission.

For the convenience of description, the present invention assumes that N_RTF=N_FR=(N_s)/2, but the present invention is not limited to the aforementioned assumption.

When a node needs to transmit an RTF signal for a packet i, the node transmits an RTF tone signal from a subcarrier j. At this time, j is obtained by i mod N_RTF.

Similarly, when a node needs to transmit an FR signal for a packet i, the node transmits an FR tone signal on a subcarrier j. At this time, j is obtained by N_RTF+i mod N_FR. Here, mod represents the modular operation. Therefore, a receiver may know for which packet an RTF signal and/or FR signal is intended by identifying the subcarrier index (number) transmitted by the RTF signal and/or FR signal.

In this case, the number of simultaneous flooding in a network may be limited to (N_s)/2 at most. Otherwise, mapping between the sequence number i and a subcarrier for the RTF(i) and FR(i) may be complicated.

C. Forwarding State Lists

Each node maintains two types of lists as described below for information about forwarding state.

1) Flooding Packet List (FPL): this list is a list of received flooding packets, and if needed, is maintained to deliver flooding packets. A source node or a node receiving a flooding packet adds the sequence number of the corresponding packet to the FPL. If a sequence number of a packet is added to the FPL, it is maintained until a timer is expired after a predetermined time period (in what follow, it is called 'FPL_timeout').

2) Requesting Packet List (RPL): this list contains a sequence number of a packet that a node is currently waiting for. If a node detects RTF(i), the corresponding node adds i to its RPL. If the corresponding node receives a packet i or gives up receiving packets after a predetermined time period (in what follows, it is called 'RPL_timeout') is passed, the sequence number i is removed from the RPL.

Each node is used only for maintaining status information and performing internal operations. Since the status information is not shared with a neighbor node, additional communication overhead is not generated except for the two control signals of RTF(i) and FR(i).

D. Algorithm

The STR-FLOOD employs a 'advertisement-request-data transfer' approach to complete flooding reliably and at the same time, to minimize communication overhead. Accordingly, the present invention proposes the following flooding method based on RTF(i) and FR(i).

In what follows, for the convenience of descriptions, it is assumed that every transmission is wireless broadcast. Also, it is further assumed that a source node S has a flooding packet.

1) The source node S assigns a sequence number i to the flooding packet. And the source node S adds a packet P(i) to its FPL and transmits RTF(i).

2) If a node has received the RTF(i) but not received P(i) yet, the corresponding node transmits FR(i) and adds a sequence number i to the RPL.

At this time, the corresponding node may transmit FR(i) after a predetermined short time interval from the time the RTF(i) is received. Here, the short time interval may be implemented by time units of one or more symbols, slots, or subframes when the present invention is implemented in the 3GPP LTE/LTE-A system; on the other hand, the short time interval may be implemented by SIFS (Short Interframe Space) when the present invention is implemented in the WLAN system.

3) If a node receives FR(i) and has P(i) in its FPL, the corresponding node broadcasts P(i).

At this time, the node may broadcast P(i) after a predetermined time period from the time the node receives FR(i). For example, the node may broadcast P(i) after a random backoff time (T_backoff ∈[T_min, T_max]) by using the DCF (Distributed Coordination Function) of the IEEE 802.11 standard.

At this time, if the node receives RTF(i) before the time period is passed, for which the node waits to perform its own transmission (namely if the node overhears RTF(i) transmitted by another node), the corresponding node cancels scheduled transmission of P(i).

Also, if the node receives FR(i) from another node even after the scheduled transmission of P(i) is cancelled, transmission of P(i) may be rescheduled.

4) If the node receives P(i), the corresponding node transmits RTF(i) and removes i from the RPL. And the corresponding node adds P(i) to the FPL.

At this time, the corresponding node may transmit RTF(i) after a predetermined short time interval from the time it receives P(i). As described above, the short time interval may be implemented by time units of one or more symbols, slots, or subframes when the present invention is implemented in the 3GPP LTE/LTE-A system; on the other hand, the short time interval may be implemented by SIFS (Short Interframe Space) when the present invention is implemented in the WLAN system.

5) If a node does not receive P(i) for a predetermined time period (in what follows, it is called 'FR_tx_period') after FR(i) is transmitted, the corresponding node retransmits FR(i). In other words, a node may transmit FR(i) with a period of FR_tx_period until it receives P(i).

Also, if the node retransmits FR(i) more than a predetermined number of times, the corresponding node removes i from the RPL and gives up packet reception.

Due to the operation of steps (2) and (3), a node having P(i) transmits a packet only when there is an obvious request for the packet. This receiver-trigger forwarding mechanism may prevent unnecessary transmission of P(i) and improve efficiency.

Furthermore, if a transmitter detects RTF(i) indicating reception of P(i), efficiency may be improved further by cancelling scheduled transmission of P(i). This forwarding-cancellation mechanism may further reduce unnecessary transmission. When a node cancels transmission even though a few of neighbor nodes haven't received P(i) yet, these neighbor nodes retransmit FR(i) according to the step 5 above, and a node having P(i) immediately reschedules transmission of P(i) to the neighbor nodes. Therefore, cancellation of forwarding after reception of RTF(i) may not cause incomplete network flooding.

The structure of RTF and FR tone signals enables a plurality of nodes to perform simultaneous transmission. According to the step 2 above, a plurality of nodes receiving RTF(i) transmit FR(i) simultaneously. Similarly, according to the step 4 above, if a plurality of nodes receives P(i) simultaneously, a plurality of nodes transmits RTF(i) simultaneously. Even if a plurality of signals is transmitted simultaneously, the receiver may detect a signal with a high probability by using the energy detection technology described below.

E. Operation Example

FIG. 18 illustrates a protocol operation for subcarrier-level tone signaling according to one embodiment of the present invention.

FIG. 18(*a*) illustrates a multi-hop network, and FIG. 18(*b*) illustrates a process in which an operation according to the present invention is performed by using the DCF (Distributed Coordination Function) of the IEEE 802.11 standard.

Referring to FIG. 18, it is assumed that a source node S has a packet for flooding with a sequence number 1 (namely P(1)). And N_s is assumed to be 4.

First, a source node S transmits a tone signal of RTF(1) to advertise existence of P(1).

A node A detects RTF(1) from a subcarrier 1 and responds at subcarrier 3 (=N_s/2+1) with FR(1). At this time, the node A may transmit FR(1) after a predetermined short time interval (for example, SIFS) from the time the RTF(1) is received.

The source node S detects FR(1) and determines to broadcast P(1) after a random backoff time.

Now it is assumed that the node A has received P(1) successfully. Then the node A transmits RTF(1).

A node B and C may receive the RTF(1) simultaneously and therefore may transmit FR(1) at the same time (refer to <Ev.1> of FIG. 18, where 'Ev' represents an event). However, even if the two signals transmitted from the node B and C overlap with each other, an energy peak is observed only at subcarrier 3, the node A may distinguish FR(1).

The node A broadcasts P(1) after a predetermined backoff delay.

After receiving P(1), the node B and C transmit RTF(1) simultaneously (refer to <Ev. 2> of FIG. 18).

As the energy peak is detected only at the subcarrier 1, a node D recognizes RTF(1) and responds to the FR(1) so that the node B and C may schedule transmission of P(1).

As described above, subcarrier-level tone signaling allows overlapped signal transmission, thereby causing communication overhead due to exchange of RTF or FR.

However, to maintain a one-to-one relationship between a unique packet number of a packet and a subcarrier corresponding to the packet number, the number of packets that may be flooded simultaneously is limited to N_s/2. For example, since 48 subcarriers are used for data transmission in the IEEE 802.11a/g/n standard providing 24 sequence numbers, a transceiver compliant with the standard may use the 24 sequence numbers.

If only a single source node is present, or only a few flooding packets are generated, the flooding packets will be removed from the FPL after FPL_timeout; therefore, limitation of the number of subcarriers may not be a serious problem. However, if a plurality of source nodes generates different flooding packets simultaneously, some of the source nodes may select the same subcarrier for their packet transmission. And flooding of packets having the same sequence number may cause confusion and bring about incomplete flooding.

F. Dynamic Backoff Window

As described in the step 3 above, if a node having P(i) in its FPL receives FR(i), the corresponding node may determine to transmit P(i) after a random backoff time (T_backoff E [T_min,T_max]). Here, T_min is the minimum backoff time, and T_max is the maximum backoff time.

Different from the DCF of the IEEE 802.11 standard, T_backoff may be determined according to signal strength of a received FR(i).

The signal strength of a received FR(i) is represented by SNR_FR(i). More specifically, an interval W_s is fixed, and T_min and T_max are set by Eq. 2 below.

$$T_{min} = W_S \times \left(1 - \frac{\text{Max}(SNR_{FR(i)}, SNR_{thres})}{SNR_{thres}}\right) \quad \text{[Eq. 2]}$$

$$T_{max} = T_{min} + W_S,$$

In Eq. 2, Max(a, b) returns the larger element between a and b. And SNR_thres is the maximum value of the measurable SNR.

By using a dynamic backoff window for selection of a delay, a node closer to an FR(i) transmitter than other nodes scheduled for transmission of P(i) may transmit the P(i). By doing so, with a single transmission, the number of nodes receiving the P(i) may be maximized. Also, the number of transmission for complete flooding may be minimized.

Referring again to FIG. 18, distance from the node B to the node D is shorter than the distance to the node C, strength of a received FR signal is stronger, and as a result, a smaller backoff time may be selected. And the node B transmits P(i) subsequent to the FR(i) from the node D, and the node C, confirming from the node B that the radio medium is occupied, may cancel transmission of P(i).

G. Energy Detection Threshold of RTF and FR

R_RTF and R_FR represent transmission ranges of RTF (i) and FR(i), respectively. Since a node detects a tone signal from energy measurement, R_RTF and R_FR are larger than the transmission range R_DATA of a flooding packet under the assumption of the same transmission power.

A difference between transmission ranges may cause an undesirable forwarding operation. Suppose R_RTF>R_DATA, and there are two nodes v and w, the range of which is R_DATA<r<R_RTF. If node v transmits RTF(i), node w responds to FR(i) to receive P(i). However, since r>R_DATA, the probability of successful transmission of P(i) may be extremely small, and therefore, a plurality of retransmission of FR(i) and P(i) may result in a vain attempt.

Therefore, the detection threshold of FR(i) may be set to be larger than the energy detection threshold so that the two transmission ranges R_FR and R_DATA are the same. The effect of the FR(i) detection threshold on the performance of network flooding will be described later.

H. Duration of RTF and FR

When a node senses transmission on a channel, the node performs FFT by using received time domain samples to extract spectral components. Suppose a transmitted signal is a tone signal. And by measuring energy density from each subcarrier of the extracted spectrum element, the node may identify from which subcarrier the tone signal has been transmitted. However, for successful detection of a tone signal, all of the time domain samples filled in the FFT blocks (namely a total of N_FFT samples) have to include tone signal information. Therefore, the duration of RTF and FR have to be larger than (N_FFT)/W. Here, W is channel bandwidth. In other words, (N_FFT)/W is a duration of an OFDM symbol excluding the cyclic prefix. It is assumed that a plurality of (N_FFT)/W are sufficient for robust detection of a tone signal.

FIG. 19 illustrates a data transfer method according to one embodiment of the present invention.

Referring to FIG. 19, a UE (or STA) transmits (for example, broadcasts) on a first subcarrier an RTF (Ready-To-Forward) signal for advertising that the UE holds data to transfer.

At this time, an index of the first subcarrier (namely a single subcarrier or a subcarrier group) may be determined on the basis of a sequence number of data. For example, the first subcarrier index may be determined to be the same as a data sequence number.

Also, N_s data subcarriers (or the entire subcarriers comprising system bandwidth) may be divided into two groups: N_RTF subcarriers for RTF transmission and N_FR subcarrier for FR transmission. The first subcarrier index may be determined within N_RTF subcarriers for RTF transmission. For example, the first subcarrier index may be determined by j=i mod N_RTF (here, j represents the index of a subcarrier to which an RTF signal is transmitted, i is a data index, and N_RTF is an RTF subcarrier group).

At this time, an RTF signal may be transmitted in the time domain from one symbol. For example, when the present invention is implemented in the 3GPP LTE/LTE-A system, an RTF signal may be transmitted by being mapped to one RE.

Also, the RTF signal may be transmitted through the PSBCH, PSDCH, or PSCCH when the present invention is implemented in the 3GPP LTE/LTE-A system.

When a UE (or STA) receives, on a second sub-carrier, an FR (Forward-Request) signal for requesting transfer of data from another UE S1902, the UE transmits (for example, broadcasts) the corresponding data.

At this time, the index of the second subcarrier (namely a single subcarrier or subcarrier group) may be determined on the basis of a sequence number of data. For example, the second subcarrier index may be determined within N_FR subcarriers for FR transmission. For example, the second subcarrier index may be determined by j=N_RTF+i mod N_FR (here, j represents the index of a subcarrier to which an FR signal is transmitted, i is a packet index, and N_RTF is an RTF subcarrier group, and N_FR is an FR subcarrier group).

At this time, an FR signal may be transmitted in the time domain from one symbol. For example, when the present invention is implemented in the 3GPP LTE/LTE-A system, an FR signal may be transmitted by being mapped to one RE.

Also, the FR signal may be transmitted through the PSBCH, PSDCH, or PSCCH when the present invention is implemented in the 3GPP LTE/LTE-A system. Also, data may be transmitted through PSSCH.

Here, a UE may transmit data after a predetermined time period (for example, dynamic random backoff time) from the time an FR signal is received. At this time, for example, a predetermined time period may be determined by Eq. 2 above according to received strength of an FR signal. At this time, when the UE receives another RTF signal for the corresponding data from another node at the first subcarrier during the predetermined time period, the UE may cancel transmission of the corresponding data. Afterwards, if the UE receives a yet another FR signal for the corresponding data from the second subcarrier, the UE may reschedule transmission of the corresponding data.

Meanwhile, if the UE (or STA) described above is not a source node, a step of receiving data from a different node may be added.

In other words, if the UE receives an RTF signal for the data from another UE before the S1901 step, a step of transmitting (for example, broadcasting) an FR signal for the corresponding data on the second subcarrier and a step of receiving the corresponding data may be added.

Here, when the UE fails to receive the corresponding data for a predetermined time period (namely, 'FR_tx period') after transmission of the FR signal, the UE may retransmit the FR signal for the corresponding data at the second subcarrier. Also, when an FR signal is retransmitted more than a predetermined number of times, the UE may give up receiving the corresponding data.

Here, when the UE receives an RTF signal from another UE, the UE may add a sequence number of the corresponding data to its data request list (namely, RPL).

At this time, if the UE receives the corresponding data or fails to receive the corresponding data within a predetermined time period (namely, 'RPL_timeout'), the UE may remove the sequence number of the corresponding data from the data request list.

Also, if the UE receives data from another UE, the UE may add a sequence number of the corresponding data to its data forwarding list (namely, FRL).

At this time, the UE may remove the sequence number of the corresponding data from the data forwarding list after a predetermined time period (namely, 'FPL_timeout').

Reliability of STR-FLOOD

In what follows, reliability of STR-FLOOD according to the present invention will be described.

First, two conditions may be introduced for reliable flooding, and these two conditions may guarantee complete transfer of packets to all of the nodes within a network.

The STR-FLOOD according to the present invention satisfies the two conditions under the assumption that RTF(i) is received successfully.

In what follows, notations and assumptions used in this document are described.

First, a wireless multi-hop network denoted by a graph G(V, E) is considered. Here, V represents a set of nodes, and E represents a set of edges. The graph G is a connected graph. In other words, an arbitrary node v, w (EV) may communicate to each other through a direct link or multi-hop route. It is assumed that a packet (i) having a sequence number i is flooded within a network. And a set of 1-hop neighbor nodes of the node v (EV) is denoted by $N\_i(v)$.

The first-hop delivery condition: it is assumed that a source node s ($\in$ V) delivers P(i). Then all the nodes within N_1(s) receive P(i).

Successful Relay Condition: a node v ($\in$V) which has not received P(i) yet is considered. If an arbitrary node w ($\in$N_1(v)) receives P(i), the node v eventually receives P(i).

The aforementioned two conditions are sufficient to implement complete flooding.

Now it is assumed that a node s starts flooding P(i). if the first-hop delivery condition and the successful relay condition are satisfied, all of the nodes except for the s node within V (namely V\{s}) P(i) are received.

If the largest hop distance between the node s and another node w ($\in$V\ {s}) is L, the whole node set V may be represented by Eq. 3 below.

$$V=\{s_1 N_1(s), N_2(s), \ldots, N_L(s)\} \quad [\text{Eq. 3}]$$

By using mathematical induction, all of the nodes within N_I (v) (here, I $\in$ {1, 2, . . . , L}) receive P(i).

First, if the first-hop delivery condition is satisfied, all of the nodes within N_1(s) receive P(i). Suppose all of the nodes within N_k(s) receive P(i) (here, 1≤k≤L−1, k $\in$vector N). An arbitrary node x ($\in$N_k+1(s)) has at least one connected neighbor node within N_k(s). Since it is assumed that all of the nodes within the N_k(s) receive P(i), all of the nodes within N_k+1 (s) receive P(i) according to the successful relay condition. Therefore, the first-hop delivery condition and the successful relay condition may be considered as sufficient conditions for delivering P(i) to all of the nodes except for the s node within V (namely, V\{s}).

Therefore, if a network flooding protocol satisfies the first-hop delivery condition and the successful relay condition, the corresponding network flooding protocol ensures reliable delivery of P(i) on the network. If transmission of RTF(i) is detected by a neighbor node correctly, the STR-FLOOD satisfies the two conditions.

In other words, if each node detects transmission of RTF(i) correctly, and FR(i) is transmitted with a non-zero probability, the STR-FLOOD according to the present invention satisfies the first-hop delivery condition and successful relay condition.

First, the STR-FLOOD satisfies the first-hop delivery condition as follows.

When the node s delivers RTF(i), all of the nodes within N_1(s) detects RTF(i) according to the assumption. Therefore, all of the nodes within N_1(s) add i to their RPL and transmit FR(i). If the node s detects FR(i), the node s transmits P(i). Even if the node s fails to detect FR(i), a node within N_1(s) retransmits FR(i) and thereby the node s delivers P(i).

Now it is assumed that the node s has delivered P(i). if all of the nodes within N_1(s) receives P(i), these nodes stop FR(i) transmission and maintain the first-hop delivery condition. If not, FR(i) is transmitted periodically until part of the nodes which have not yet received P(i) within N_1(s) receive P(i). The node s schedules transmission of P(i) every time it detects FR(i). Therefore, all of the nodes within N_1(s) eventually receive P(i).

Next, the STR-FLOOD satisfies the successful relay condition as follows.

Now it is assumed that a specific node v ($\in$V \ {s}) has not received P(i). if a node w ($\in$N_1(v)) receives P(i), the node w transmit RTF(i). The node w may be regarded as a new source node of P(i) to which the RTF(i) has been transmitted. Since the node v belong to N_1(w), the node v receives P(i) according to the first-hop delivery condition. Therefore, the STF-FLOOD satisfies the successful relay condition.

A feedback-based flooding protocol using information of a neighbor node may also satisfy the first-hop delivery condition and successful relay condition. However, the aforementioned protocol has to use considerable communication resources to ensure reliability. In the case of a counter-based protocol and probability-based protocol, since an essential node may not deliver received packets for network connection, the two conditions above may not be satisfied even in the absence of a channel error and collision.

In an actual wireless multi-hop network, since RTF(i) may be lost due to some reason such as channel distortion, and RPL_timeout may not be extended to an infinite value, the aforementioned claim 1 is not always satisfied. However, due to energy detection techniques, detection of RTF(i) may be more robust against channel fading and collision than direct reception of P(i).

Also, if a neighbor node receives P(i) at a different time point, there may be a plurality of opportunities for a node to receive RTF(i), and accordingly, a probability of recognizing existence of P(i) is increased. If a node perceives existence of P(i) by receiving RTF(i), the corresponding node transmits FR(i) until P(i) is received.

Feasibility of Tone Signal Detection

In what follows, described will be an experimental result for verifying feasibility of tone signal generation and tone signal detection according to the present invention.

The experiment is based on a simple testbed comprising three hosts. One host operates as a tone signal detector RX1, and the other hosts operate as tone signal transmitters TX1, TX2. An OFDM communication channel holding a 1 MHz baseband and 256 subcarriers is taken into account. Therefore, the space between two consecutive subcarriers is 3906.25 Hz. The tone signal detector RX1 performs FFT on the time domain complex samples and calculates a squared magnitude of a signal at each subcarrier.

FIG. 20 illustrates tone signal generation and an experimental result of tone signal detection in a data flooding method according to one embodiment of the present invention.

FIG. 20 shows a calculation result of squared magnitude of each subcarrier at RX1 when TX1 transmits a tone signal at subcarrier 40 (namely at 2, 400, 156, 250 Hz).

As shown in FIG. 20, a peak is observed around the subcarrier 40. Peaks are also observed at subcarrier 0 and 255, which are caused by a DC bias, however.

It should be noted that a large value of squared magnitude is also observed at the subcarriers adjacent to the subcarrier 40. This spectral leakage may include discontinuity of a signal at the end of a measurement period, which is in fact unavoidable. Therefore, mapping a sequence number to a subcarrier group comprising a plurality of subcarriers may improve accuracy of RTF and FR detection.

Next, an effect of an overlapping tone signal on the detection performance will be described.

FIG. 21 illustrates an experimental result of generation and detection of a tone signal in a data flooding method according to one embodiment of the present invention.

FIG. 21 shows a change of squared magnitude on the subcarrier 40 at RX1. It should be noted that TX1 is closer to RX1 than TX2. First, when two transmitters are inactive, only noise signal is observed. When TX2 starts to transmit a tone signal at the subcarrier 40, the squared magnitude on the subcarrier grows rapidly. Since the squared magnitude value exceeds a detection threshold, RX1 may determine that a tone signal has been transmitted from a subcarrier. Afterwards, TX1 starts to transmit a tone signal from the same subcarrier. The squared magnitude value increases further and is not decreased even if TX2 stops transmission. From this result, a node may detect overlapping transmission of a tone signal, and received signal strength is dominant because of the transmission from a node close to the receiver. In this regard, as described above, a dynamic backoff window may be used.

Simulations Results

In what follows, a performance evaluation result of STR-FLOOD through a simulation study is described. Through the simulation study, the STR-FLOOD is compared with other flooding methods operating without topological information (unconditional flooding, GOSSIP1(p), and GOSSIP3 (p, k, m)). The simulation result showed that STR-FLOOD provides higher performance than the others in terms of both reliability and efficiency.

A. Implementation

It is assumed that an RTF (Ready-To-Forward) and FR (Forward-Request) signal are added to the MAC layer control frame. If reception SINR is larger than an RTF detection threshold (RTF_thres) and FR detection threshold (FR_thres), a node may detect each of these signals. The RTF_thres is set to be the same as an energy detection threshold (−99 dB), and FR_thres is set to be slightly higher than the energy detection threshold (−97.5 dB). The reason why the FR_thres is set to be higher than the energy detection threshold is to prevent unnecessary delivery attempts that may occur on a weak link. Simulation parameters for STR-FLOOD are shown in Table 1.

Table 1 shows simulation parameters used for STR-FLOOD.

TABLE 1

| Parameter | Value |
| --- | --- |
| Threshold for RTF Detection (RTF_thres) | −99 (dBm) |
| Threshold for FR Detection (FR_thres) | −97.5 (dBm) |
| Flooding Packet Buffer Timeout (FPL_timeout) | 1500 (msec) |
| Requesting Packet List Timeout (RPL_timeout) | 250 (msec) |
| FR Transmission Period (FR_tx_period) | 50 (msec) |
| SNR Threshold($SNR_{thres}$) | 5 (dB) |
| Duration of RTF ($T_{RTF}$) | 10 (usec) |
| Duration of FR ($T_{FR}$) | 10 (usec) |
| Duration of S I F S | 9 (usec) |

B. Flooding Schemes in Comparison

STR-FLOOD is compared with three other well-known flooding methods such as unconditional flooding, GOSSIP1 (p), and GOSSIP(p, k, m). In the unconditional flooding method, if a node receives P(1), the corresponding node delivers P(1) after a random backoff time. In the GOSSIP1 (p), if a node receives P(1), the corresponding node delivers P(1) after a random backoff time with a probability of p. The GOSSIP(p, k, m) adds several delivery conditions to improve reliability of the GOSSIP1(p). In the GOSSIP(p, k, m), if a node within the first k-hop from a source node receives P(1), the node delivers P(1) with the probability of 1. Other nodes may deliver P(1) with a probability of p or listens to a channel for a predetermined time period. If these nodes are unable to overhear transmission of P(1) m times or more, these nodes deliver P(1) with the probability of 1. All of the methods including the one proposed by the present invention do not require any topological information. The GOSSIP1(p) and GOSSIP(p, k, m) are widely used for flooding and achieved good performance in the simulation and experiments in an actual testbed. In the present simulation, p, k, and m are set to 0.7, 1, and 1, respectively.

C. Performance Metric

In the present simulation, to evaluate performance of network flooding, the following two metrics are employed.

1) Packet Delivery Ratio (PDR): PDR refers to the ratio of a total number of nodes capable of receiving a packet (namely those nodes connected to a source node) to the number of nodes which have actually receives a flooding packet. If a Packet Reception Ratio (PRR) between a node v and a node w is larger than 1, it is assumed that a communication link I (v, w) exists between the node v and the node w. Therefore, some nodes may be disconnected from a network due to a poor radio channel and may be excluded when the total number of connected nodes are counted.

2) Communication overhead: communication overhead may be defined by a total sum of the number of transmissions used for packet delivery and signaling. T_p represents the number of transmissions of packets, and N_p represents the total number of transmissions of packets on a network. Also, N_FR represents the total number of FR retransmissions for a packet. On the other hand, the STR-FLOOD according to the present invention additionally includes the numbers of transmissions for an RTF and FR signal. They are denoted by T_RTF and T_FR, respectively. Therefore, communication overhead of the STR-FLOOD may be calculated by Eq. 4 below.

$$(T_P + SIFS + T_{RTP} + SIFS + T_{FR})N_P + T_{FR}N_{FR} \quad [\text{Eq. 4}]$$

D. Simulation Environment

The present simulation uses the 802.11 DCF as the MAC protocol. Each node transmits a signal with the same rate (6 Mbps) and power (10 dBm). To model packet loss in a link, a log-distance propagation loss model and a Nist error rate model are used. Based on these models, if a node detects a signal exceeding an energy threshold (−99 dB), the corresponding node calculates a reception probability p_rx from a reception signal power, floor noise, and interference. And the corresponding node transmits a received packet to the upper layer with a probability of p_rx.

FIG. 22 illustrates a simulation result of a data flooding method according to one embodiment of the present invention.

FIG. 22 illustrates a packet reception rate according to SINR.

Referring to FIG. 22, the packet reception rate is gradually decreased according to the reception SINR. If the distance between a transmitter and a receiver is increased or length of transmitted packets is increased, the packet reception rate becomes smaller. Therefore, the simulation follows a graded SINR model.

The present simulation considers 5 types of node density such as {100, 150, 200, 250, 300}, and nodes are distributed randomly over the area of 1000×1000 m'. With respect to the node density, simulations are performed 50 times with different random seeds. Here, the average numbers of nodes connected to a source node during 50 runs of the simulation are {66.34, 141.54, 199.44, 249.78, 300}. To calculate the PDR, these average values are used. The size of a contention window W_s is set to 50 ms, and the size of P(1) is set to 1024 bytes. When there is no node having scheduled transmission of P(i) within a network, the simulation is terminated. The simulation parameters are summarized in Table 2.

Table 2 shows default simulation parameters.

TABLE 2

| Parameter | Value |
| --- | --- |
| Network Area | 1000 × 1000 m² |
| Propagation Loss Model | Log-distance Loss Model |
| Propagation Speed | 3.0 × 10⁸ m/s |
| Error Model | Nist Error Model [26] |
| Transmission Power | 16.0206 dBm |
| Transmission Rate | 6 Mbps |
| Energy Detection Threshold | −99 dB |
| Size of Window for Random Back-off Time ($W_S$) | 50 ms |
| Packet Size | 1024 bytes |
| Number of Trials | 50 |

E. Results

FIG. 23 illustrates a simulation result of a data flooding method according to one embodiment of the present invention.

FIG. 23 illustrates a PDR of STR-FLOOD, unconditional flooding, GOSSIP1 (0.7), and GOSSIP3 (0.7, 1, 1) according to different node density.

Referring to FIG. 23, in a network exhibiting high node density, since a majority of nodes participate in packet delivery, and transmission for redundant delivery compensates for packet loss due to collision or channel error, the PDR is close to 1 for all of the methods.

However, as the density of a network decreases, STR-FLOOD has a more improved PDR than other flooding methods. The weaker the connectivity, the more the number of essential nodes for reliable packet delivery. And the packet loss during a delivery procedure may deteriorate the PDR.

In the GOSSIP1(0.7) and GOSSIP3(0.7, 1, 1), since a node refuses delivery of a received packet with a probability of 0.3, the corresponding PDR is smaller than the unconditional flooding method. On the other hand, in STR-FLOOD, if a node detects RTF(i) at all, FR(i) is transmitted repeatedly if packet i is not received. Thus less packets are lost partially.

The advantage of using STR-FLOOD is more pronounced in terms of efficiency.

FIG. 24 illustrates a simulation result of a data flooding method according to one embodiment of the present invention.

FIG. 24 illustrates communication overhead of STR-FLOOD, unconditional flooding, GOSSIP1(0.7), and GOSSIP3(0.7, 1, 1) according to different node density.

Referring to FIG. 24, if the number of nodes is 200 or more, STR-FLOOD shows the smallest communication overhead among them. In a network with low density, almost all delivery attempts are essential to achieve complete delivery of a packet, STR-FLOOD exhibits almost the same communication overhead as the unconditional flooding method.

As node density is increased, STR-FLOOD successfully manages communication overhead at low levels. The GOSSIP1(0.7) and GOSSIP3(0.7, 1, 1) shows a smaller PDR but low communication overhead compared with the unconditional flooding method.

Except for STR-FLOOD, overhead is increased in all of flooding methods according to node density. On the other hand, STR-FLOOD achieves bounded overhead independent of node density. In STR-FLOOD, the number of nodes which determine delivery of packet i after receiving FR(i) increases in proportion to the node density. However, most of the nodes cancel transmission schedules after RTF(i) is received.

In what follows, an effect of a dynamic backoff window will be described.

FIGS. 25 and 26 illustrate a simulation result of a data flooding method according to one embodiment of the present invention.

FIGS. 25 and 26 illustrate the PDR and communication overhead of STR-FLOOD using a fixed backoff window (namely T_backoff ∈[0,W_s]) and a dynamic backoff window (namely T_backoff ∈[T_min,T_max]). Here, T_min and T_max are configured by Eq. 2 above.

The PDR is similar when a dynamic backoff window is used (see FIG. 25), but communication overhead is considerably improved (see FIG. 26). The dynamic backoff window mechanism successfully increases the effect of single transmission.

Next, an effect of an FR detection threshold in STR-FLOOD will be described.

FIGS. 27 and 28 illustrate a simulation result of a data flooding method according to one embodiment of the present invention.

FIGS. 27 and 28 illustrate PDR and communication overhead of STR-FLOOD when different values are applied with respect to the respective FR detection thresholds.

Referring to FIG. 27, PDR is slightly decreased as the FR detection threshold is increased. If a large FR detection threshold is used, a node having P(i) within an FPL may easily ignore transmission of FR(i). Accordingly, an opportunity for packet delivery may be limited, and even If a low PDR may be obtained, the amount of reduction of PDR within STR-FLOOD is negligible.

Meanwhile, configuring the FR detection threshold with an appropriate value may reduce communication overhead considerably. As shown in FIG. 28, communication overhead is kept to an almost the same level until the FR detection threshold reaches 0.8 dB, after which the FR detection threshold begins to decrease. If the FR detection threshold is too small, a node connected to FR(1) transmitter through a weak link determines transmission of P(1) after detecting FR(1) even if the link quality is too poor to transmit P(1). This kind of transmission may not improve PDR, only to consume communication resources.

Therefore, it is necessary to configure the FR detection threshold so that P(1) may be delivered to FR(1) transmitter with a high probability. According to a rule of thumb, setting the FR detection threshold to be slightly higher than an energy detection threshold ensures reliability of STR-FLOOD while generating a reasonable amount of communication overhead.

In what follows, an effect of a signal detection error will be described.

FIG. 29 illustrates a simulation result of a data flooding method according to one embodiment of the present invention.

FIG. 29 illustrates PDR of STR-FLOOD according as the detection error probabilities of RTF(1) and FR(1) are increased.

In a network with low density, a detection error significantly deteriorates PDR. A node which fails to receive P(1) due to loss of RTF(1) does not detect existence of P(1). Similarly, due to loss of FR(1), an essential forwarder which has received P(1) is made unable to deliver P(1).

However, referring to FIG. 29, since each node has a sufficient number of potential forwarders as node density is increased, the detection error does not affect the PDR. If the detection error probability is lower than 0.3, the PDR of STR-FLOOD is still higher than the PDR of the unconditional flooding method (UF of FIG. 29).

FIG. 30 illustrates a simulation result of a data flooding method according to one embodiment of the present invention.

FIG. 30 illustrates communication overhead of STR-FLOOD due to change of detection error probabilities of RTF(1) and FR(1).

Referring to FIG. 30, in the case of 100 nodes, communication overhead is reduced. This is so because an essential forwarder is unable to participate in the delivery of P(1) due to the loss of RTF(1) and FR(1). However, as node density is increased, communication overhead is increased. If the detection error probability is high, a node close to FR(1) transmitter may be easily excluded from delivery of P(1). Therefore, STR-FLOOD is unable to utilize all of the advantages provided by an dynamic backoff window. Nevertheless, the communication overhead of STR-FLOOD is considerably low compared with other flooding methods.

Subcarrier-level signal transmission and detection capability may be used for various kinds of researches to improve throughput of the WLAN system. The Back2F proposes a frequency domain backoff mechanism according to which a tone signal is transmitted selectively on a random backoff subcarrier. Also, FICA (Fine-grained Channel Access) proposes a fine-grained channel access method that enables subchannel-based simultaneous transmission for improving throughput of the WLAN system.

STR-FLOOD according to the present invention determines the gain of subcarrier-level signaling by using the method described above but focuses more on reliable, scalable network flooding rather than network throughput.

SMACK (SiMultaneous ACKnowledgment) proposes a subcarrier-level ACK (Acknowledgment) technique for reliable broadcast transmission in a wireless network. According to the aforementioned method, when a node broadcasts a packet, a receiver responds with a tone signal at a subcarrier associated with a packet transmitter. And the packet transmitter checks a tone signal (namely ACK) at each subcarrier and retransmits a packet if needed. In network flooding, to reduce unnecessary retransmission, the arrival time of an ACK signal may be used to select the farthest node as the next packet forwarder. However, since all of the nodes have to maintain a list of their neighbor nodes and negotiate ACK subcarriers with all of the neighbor nodes, SMACK is not flexible in a network with high density. Also, a node not connected to the next forwarder may miss a flooding packet.

In the STR-FLOOD according to the present invention, a process of dealing with P(i)-RTF(i)-FR(i) is motivated by SPIN, which is an application-level approach for disseminating information in a wireless sensor network. According to the SPIN, a node having new data transmits an ADV message to neighbor nodes. If an ADV is received, a neighbor node which has failed to receive advertised data responds with a REQ message. If a REQ message is received for advertised data, an ADV message forwarder transmits data.

ReMHoC (Reliable multicast protocol for wireless mobile multi-hop ad hoc networks) uses a method similar to the one for a reliable multicast service in a mobile ad-hoc network. In this method, if a node detects loss of a multicast packet through sequence number matching, the corresponding node multicasts a REQUEST message including a sequence number for the missed data packet. If a multicast member holding a copy of the missed packet receives the REQUEST message, the multicast member responds by multicasting a cached copy.

A method similar to SPIN (Sensor Protocols for Information via Negotiation) has been used for propagate an urgent message in a vehicular ad-hoc network (VANET). In this method, an ACK frame in the MAC layer includes a sequence number of a received urgent message. An urgent message forwarder selects one from among neighbor nodes as a proxy for ACK transmission. If a node overhears an ACK message indicating a new urgent message, the node transmits a REQUEST frame after a predetermined backoff time to receive the message.

The methods described earlier has a common disadvantage with respect to scalable network flooding. First, these methods require topology information for operation (for example, a list of neighbor nodes). Also, these methods do not support simultaneous transmission and as a result, cause excessive communication overhead. On the other hand, different from those methods, STR-FLOOD does not require any topological information nor a procedure related to an operation. Moreover, since a plurality of nodes transmit RTF(i)/FR(i) simultaneously, communication overhead due to exchange of P(i)-RTF(i)-FR(i) does not change.

This document proposes a scalable network flooding protocol that achieves a high PDR with low communication overhead. In the STR-FLOOD, a node schedules transmission of a packet only when a neighbor node makes a clear request for a packet. Packet transmission is delayed for a random backoff time, and if a transmitter is notified of packet reception from a neighbor node during the time period, the transmitter cancels packet transmission. As described in detail above, since the STR-FLOOD satisfies two sufficient conditions for complete delivery of a packet, reliability is demonstrated. Also, related to reliability and efficiency, the STR-FLOOD provides higher performance than existing methods.

General Wireless Communication to which the Present Invention is Applicable

FIG. 31 illustrates a block diagram of a wireless communication apparatus according to an embodiment of the present invention.

Referring to FIG. 31, a wireless communication system includes a eNB(or AP) 3110 and a multitude of UEs 3120.

The eNB(or AP) 3110 includes a processor 3111, a memory 3112, and a radio frequency (RF) unit 3113. The processor 3111 implements the function, process, and/or method proposed in FIGS. 1 to 30. The layers of wireless interface protocols may be implemented by the processor 3111. The memory 3112 may be connected to the processor 3111 so as to store various information in order to drive the processor 3111. The RF unit 3113 may be connected to the processor 3111 so as to transmit and/or receive a wireless signal.

The UE(or non-AP STA) 3120 includes a processor 3121, a memory 3122, and a RF unit 3123. The processor 3121 implements the function, process and/or method proposed in FIGS. 1 to 30. The layers of the wireless interface protocol may be implemented by the processor 3121. The memory 3122 may be connected to the processor 3121 so as to store various informations for driving the processor 3121. The RF unit 3123 is connected to the processor 3121 so as to transmit/or receive a wireless signal.

The memories 3112 and 3122 may be inside or outside processors 3111 and 3121 and may be connected to the processors 3111 and 3121 by well-known various means. Further, the eNB(or AP) 3110 and/or the UE(or non-AP STA) 3120 may include a single antenna or a multiple antenna.

In the aforementioned embodiments, the elements and characteristics of the present invention have been combined in specific forms. Each of the elements or characteristics may be considered to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

An embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

A data flooding method in a wireless communication system supporting D2D communication according to the present invention has been described with an example applied to the 3GPP LTE/LTE-A system to the IEEE 802.11 system. However, the present invention may be applied to various wireless communication systems in addition to the 3GPP LTE/LTE-A system and the IEEE 802.11 system.

The invention claimed is:

1. A method for a user equipment (UE) to perform data transfer in a wireless communication system that supports device-to-device communication, the method comprising:
broadcasting a first Ready-To-Forward (RTF) signal on a first sub-carrier for advertising that the UE holds data to transfer;
receiving a first Forward-Request (FR) signal on a second sub-carrier for requesting transfer of the data from a first another UE; and
broadcasting the data after a first predetermined time when a sequence number of the data is included in a data transfer list of the UE,
wherein a first detection threshold value of the data indicating a coverage of a data transmission is smaller than a second detection threshold value of the first RTF signal indicating a coverage of a first RTF signal transmission,
wherein the first predetermined time is set differently for each UE in the wireless communication system, and
wherein the first sub-carrier and the second sub-carrier are determined on the basis of the sequence number of the data, respectively.

2. The method of claim 1, wherein the first predetermined time is determined on the basis of received strength of an FR signal for the data.

3. The method of claim 1, wherein, when the UE receives an second RTF signal for the data from a second another UE within the first predetermined time on the first sub-carrier, transfer of the data is cancelled.

4. The method of claim 3, wherein, when the UE receives a second FR signal for the data from a third another UE after receiving the second RTF signal, within the first predetermined time on the second sub-carrier, transfer of the data is rescheduled, and
wherein the third another UE is the first another UE or not the first another UE.

5. The method of claim 1, wherein the entire sub-carriers in system bandwidth are divided into a first sub-carrier group for an RTF signal transmission and a second sub-carrier group for an FR signal transmission; and
the first sub-carrier is determined from the first sub-carrier group, and the second sub-carrier is determined from the second sub-carrier group.

6. The method of claim 1, further comprising:
broadcasting aria second FR signal for the data on the second sub-carrier when the UE receives a second RTF signal for the data from a second another UE; and
receiving the data.

7. The method of claim 6, wherein, when the UE receives the second RTF signal for the data from the second another UE, the sequence number of the data is added to a data request list of the UE.

8. The method of claim 7, wherein, when the UE receives the data or does not receive the data within a second predetermined time, the sequence number of the data is removed from the data request list.

9. The method of claim 6, wherein, when the UE receives the data, the sequence number of the data is added to the data transfer list of the UE.

10. The method of claim 9, wherein the sequence number of the data is removed from the data transfer list after a third predetermined time.

11. The method of claim 6, wherein, when the UE does not receive the data within a fourth predetermined time after transmitting the second FR signal for the data, the second FR signal for the data is re-broadcasted.

12. The method of claim 11, wherein, when the second FR signal is re-broadcasted more than a predetermined number of times, reception of the data is terminated.

13. A user equipment (UE) performing data transfer in a wireless communication system that supports device-to-device communication, the UE comprising:
a Radio Frequency (RF) transmitter for transmitting a radio signal;
an RF receiver for receiving a radio signal; and
a processor for controlling the RF unit, wherein the processor is configured
to broadcast a first Ready-To-Forward (RTF) signal on a first sub-carrier for advertising that the UE holds data to transfer;
to receive a first Forward-Request (FR) signal on a second sub-carrier for requesting transfer of the data from a first another UE; and
to broadcast the data after a first predetermined time when a sequence number of the data is listed in a data transfer list of the UE,
wherein a first detection threshold value of the data is smaller than a second detection threshold value of the first RTF signal and the first FR signal,
wherein the first predetermined time is set differently for each UE in the wireless communication system, and
wherein the first sub-carrier and the second sub-carrier are determined on the basis of the sequence number of the data, respectively.

* * * * *